United States Patent
Ciabarra, Jr. et al.

(10) Patent No.: US 11,100,275 B2
(45) Date of Patent: *Aug. 24, 2021

(54) TECHNIQUES FOR VIEW CAPTURE AND STORAGE FOR MOBILE APPLICATIONS

(71) Applicant: Quantum Metric, Inc., Monument, CO (US)

(72) Inventors: Mario Luciano Ciabarra, Jr., Colorado Springs, CO (US); Joseph Eric Pastuer, Colorado Springs, CO (US)

(73) Assignee: Quantum Metric, Inc., Monument, CO (US)

( * ) Notice: Subject to any disclaimer, the term of this patent is extended or adjusted under 35 U.S.C. 154(b) by 35 days.

This patent is subject to a terminal disclaimer.

(21) Appl. No.: 16/813,318

(22) Filed: Mar. 9, 2020

(65) Prior Publication Data

US 2020/0210641 A1   Jul. 2, 2020

Related U.S. Application Data

(63) Continuation of application No. 15/722,911, filed on Oct. 2, 2017, now Pat. No. 10,592,587.
(Continued)

(51) Int. Cl.
*G06F 3/048* (2013.01)
*G06F 40/106* (2020.01)
(Continued)

(52) U.S. Cl.
CPC .......... *G06F 40/106* (2020.01); *G06F 40/123* (2020.01); *G06F 3/013* (2013.01);
(Continued)

(58) Field of Classification Search
CPC ...... G06F 40/106; G06F 40/123; G06F 40/14; G06F 9/451; G06F 3/013; G06F 3/0481
(Continued)

(56) References Cited

U.S. PATENT DOCUMENTS 7,523,191 B1   4/2009   Thomas et al.
7,941,525 B1   5/2011   Yavilevich
(Continued)

OTHER PUBLICATIONS

U.S. Appl. No. 15/722,911, "Non-Final Office Action", dated Mar. 8, 2019, 12 pages.
(Continued)

*Primary Examiner* — Hassan Mrabi
(74) *Attorney, Agent, or Firm* — Kilpatrick Townsend & Stockton LLP

(57) ABSTRACT

Techniques can capture, store, and regenerate a view of content in applications (e.g., native applications) on devices (e.g., a mobile device). A capture management system can produce compact data storage of views of content in an application on a device and the efficient search thereof of views of content provided in the application. The views of content can be translated into a transportable data layer, such as HTML, and captured using delta encoding to identify changes and modifications in content accessed in any application at a device. A capture management system can accurately and efficiently capture events displayed for an application at a device and send the events to a server-side system, which can combine the events to reassemble the events. A user interface and user interaction events on an application at a mobile device can be reassembled for the purpose of playback and analysis of interactions with the application.

15 Claims, 10 Drawing Sheets

Related U.S. Application Data

(60) Provisional application No. 62/402,260, filed on Sep. 30, 2016.

(51) Int. Cl.
  *G06F 40/123* (2020.01)
  *G06F 3/0481* (2013.01)
  *G06F 3/01* (2006.01)
  *G06F 9/451* (2018.01)
  *G06F 40/14* (2020.01)

(52) U.S. Cl.
  CPC ............ *G06F 3/0481* (2013.01); *G06F 9/451* (2018.02); *G06F 40/14* (2020.01)

(58) Field of Classification Search
  USPC ......................................................... 715/234
  See application file for complete search history.

(56) References Cited

U.S. PATENT DOCUMENTS

| | | |
|---|---|---|
| 9,396,385 B2 | 7/2016 | Bentley et al. |
| 9,413,708 B1 | 8/2016 | Michael et al. |
| 9,448,908 B2 | 9/2016 | Carmi |
| 9,508,081 B2 | 11/2016 | Yavilevich |
| 9,792,365 B2 | 10/2017 | Yavilevich |
| 9,904,517 B2 | 2/2018 | Carmi |
| 9,910,685 B2 | 3/2018 | Desineni et al. |
| 9,965,464 B2 | 5/2018 | Bondarenko et al. |
| 10,033,702 B2 | 7/2018 | Ford et al. |
| 10,063,645 B2 | 8/2018 | Yavilevich et al. |
| 10,079,737 B2 | 9/2018 | Schlesinger et al. |
| 10,146,752 B2 | 12/2018 | Ciabarra, Jr. et al. |
| 10,318,592 B2 | 6/2019 | Ciabarra, Jr. et al. |
| 10,592,587 B2 | 3/2020 | Ciabarra, Jr. et al. |
| 2013/0212487 A1 | 8/2013 | Cote |
| 2016/0188548 A1 | 6/2016 | Ciabarra, Jr. et al. |
| 2017/0017650 A1 | 1/2017 | Ciabarra, Jr. et al. |
| 2017/0132023 A1 | 5/2017 | Desineni et al. |
| 2017/0132024 A1 | 5/2017 | Desineni et al. |
| 2017/0228119 A1* | 8/2017 | Hosbettu ................ G06Q 10/00 |
| 2018/0095941 A1 | 4/2018 | Ciabarra, Jr. et al. |

OTHER PUBLICATIONS

U.S. Appl. No. 1515/722,911, "Notice of Allowance", dated Nov. 6, 2019, 9 pages.

* cited by examiner

TECHNIQUES FOR VIEW CAPTURE AND STORAGE FOR MOBILE APPLICATIONS

CLAIM OF PRIORITY AND INCORPORATION BY REFERENCE

The present application is a continuation of U.S. application Ser. No. 15/722,911, filed Oct. 2, 2017 entitled "TECHNIQUES FOR VIEW CAPTURE AND STORAGE FOR MOBILE APPLICATIONS," which claims the benefit and priority under 35 U.S.C. 119(e) of U.S. Provisional Application No. 62/402,260, filed Sep. 30, 2016, entitled "TECHNIQUES FOR VIEW CAPTURE AND STORAGE FOR MOBILE APPLICATIONS," the entire contents of which are incorporated herein by reference for all purposes.

FIELD

The present disclosure relates generally to techniques (e.g., systems, apparatuses, computer-readable media, and methods) for capturing, storing, and regenerating a view of content in applications on devices.

BACKGROUND

The proliferation of mobile devices has led to wide-spread development of applications ("apps") for mobile devices. The growth of application development of mobile-based applications has been further fueled by the expansion of different platforms on mobile devices, which provide different functionality to support application development. The introduction of client-side and mobile device technologies has enabled applications to become increasingly dynamic, allowing users to interact directly with the applications with little or no requests to a back-end server for content change. Some applications may determine display content based on a model, such as a Document Object Model (DOM), which can enable the applications to dynamically determine a view for a document.

Because content within an application is dynamic, such that it can be modified within the application, application developers and content providers often may not have a clear insight into how their audience is using and interacting with any given application. Due to the large amount of permutations of content in an application based on how users can interact with the application, many people such as content providers and application developers are trying to determine the view of content and user interactions in the application at any given time. Varying factors, such as network conditions, mobile device performance, and application performance, may affect performance of any application, such as displaying partial content or freezing execution of an application. Users may be frustrated, often times ceasing use of application. Application developers and providers are challenged with trying to determine the stage at which a user ceases use of an application.

BRIEF SUMMARY

Embodiments relate generally to techniques (e.g., systems, apparatuses, computer-readable media, and methods) for capturing, storing, and regenerating a view of content in applications (e.g., native applications) on devices (e.g., a mobile device). Some embodiments relate to compact data storage of views of content in an application and the efficient search thereof. Some embodiments provide techniques (e.g., systems, apparatuses, computer-readable media, and methods) to accurately and efficiently capture events displayed for an application at a device and send the events to a server-side system, which can combine the events to reassemble the events. For example, user interface and user interaction events on an application at a mobile device can be reassembled for the purpose of playback and analysis of interactions with the application. Some embodiments relate to techniques (e.g., systems, apparatuses, computer-readable media, and methods) for efficient capture of views of content provided at applications on a device. The views of content can be captured using delta encoding to identify changes and modifications in content accessed in any application at a device.

In some embodiments, techniques are disclosed to efficiently capture events (e.g., a views, changes in views, and interactions with views) in an application at a device. Information about the events may be stored on the device and/or sent to a computer system, which can combine the events to reassemble the events. For example, user interface and user interaction events in an application can be reassembled for the purpose of playback and analysis.

The techniques disclosed herein reduce storage costs for storing views of an application and can improve processing efficiency by reducing the amount of data stored. Further, the limited amount of data can be used to recreate the views in applications. For example, an entity can use the compact stored views to determine what views were provided by an application. This can enable the entity to assess how users or computer systems used and interacted with an application, as well as how the application behaved and responded to dynamic interactions. Through analysis of data stored using techniques disclosed herein, a user can discover points of failure, successes, and trends, any of which may then be used to optimize the design of the organization's operations and service through an application.

In some embodiments, compact storage of views in an application may include performing a comparison to discover what parts of a view have changed, and only the differences are stored. The techniques disclosed herein enable a reduction in costs of storage by preventing the storage of duplicate views of applications. The techniques disclosed herein can detect changes in a view of an application presented at a client and can capture the changes in the view. The differences can be communicated from the client to a capture system that can store the differences in a document. The capture system can store content that is common, or more likely to appear in views. Using the content most likely to appear in a view, the capture system can communicate such content to a client. The client uses the content to identify differences, or changes in a view, which can be communicated to the capture system. Some embodiments allow clients to use fingerprints, e.g. hashed data of content most likely to appear in a view sent by the capture system to pinpoint only the changing portions of the view instead of sending the entire document. The capture system can assemble or regenerate a view in an application at a client based on the differences and the content most likely to appear in a view.

Thus, embodiments minimize the amount of data being sent by the client to a capture system yet allow the capture system to recreate the exact view rendered in an application at the client. Some embodiments provide for significant reductions in client data storage needs for storing views and simultaneously vastly reduce the time and processing resources required for a client to communicate views seen at the client.

Some embodiments may be implemented by a computer system that is configured to implement methods and operations disclosed herein. Yet some embodiments relate to systems, computer products, and machine-readable tangible storage media, which employ or store instructions for methods and operations disclosed herein. In at least one embodiment, systems may include one or more processors and memory. The memory may store instructions that are executable by the one or more processors to perform methods and operations disclosed herein. Systems may include a computer product, systems, portable consumer devices, machine-readable tangible storage media, modules, or a combination thereof, to perform methods and operations disclosed herein. Other embodiments are directed to systems, portable consumer devices, and computer readable media associated with methods described herein.

In at least one embodiment, a method may include detecting that an application on a device is loading a view in the application. The application may be a native application configured for a native environment on the device. The device may be a mobile device. The method may include analyzing, by a capture system, the view in the application to determine a layout of the view. The capture system may be implemented at a server computer. The capture system may be implemented by the device. The method may include generating, by the capture system, a document having the layout of the view. The method may include sending, to a computer system, the document for storage. The method may include detecting a change in the view based on monitoring operation of the application on the device. The method may include performing an operation based on the change in the view. Performing the operation may include generating a graphical interface to display the view based on the layout in the document, where the view is displayed showing the detected change. Performing the operation may include sending, to the computer system, a notification about the change in the view, where the computer system is a server computer implemented a capture management system. In some embodiments, the method may include involving a capture management system to determine the layout of the view. In at least one embodiment, the method may include updating the layout of the view in the document based on the detected change. The method may include sending, to the computer system, the update to the layout in the document for storage.

A better understanding of the nature and advantages of embodiments of the present disclosure may be gained with reference to the following detailed description and the accompanying drawings.

DETAILED DESCRIPTION

In the following detailed description of exemplary embodiments of this disclosure, reference is made to the accompanying drawings which form a part hereof, and in which is shown by way of illustration specific exemplary embodiments in which this disclosure may be practiced. These embodiments are described in sufficient detail to enable those skilled in the art to practice this disclosure, and it is to be understood that other embodiments may be utilized and that logical, mechanical, electrical and other changes may be made without departing from the scope of the present disclosure.

I. High-Level Architecture of Capture Management System

Figure 1:
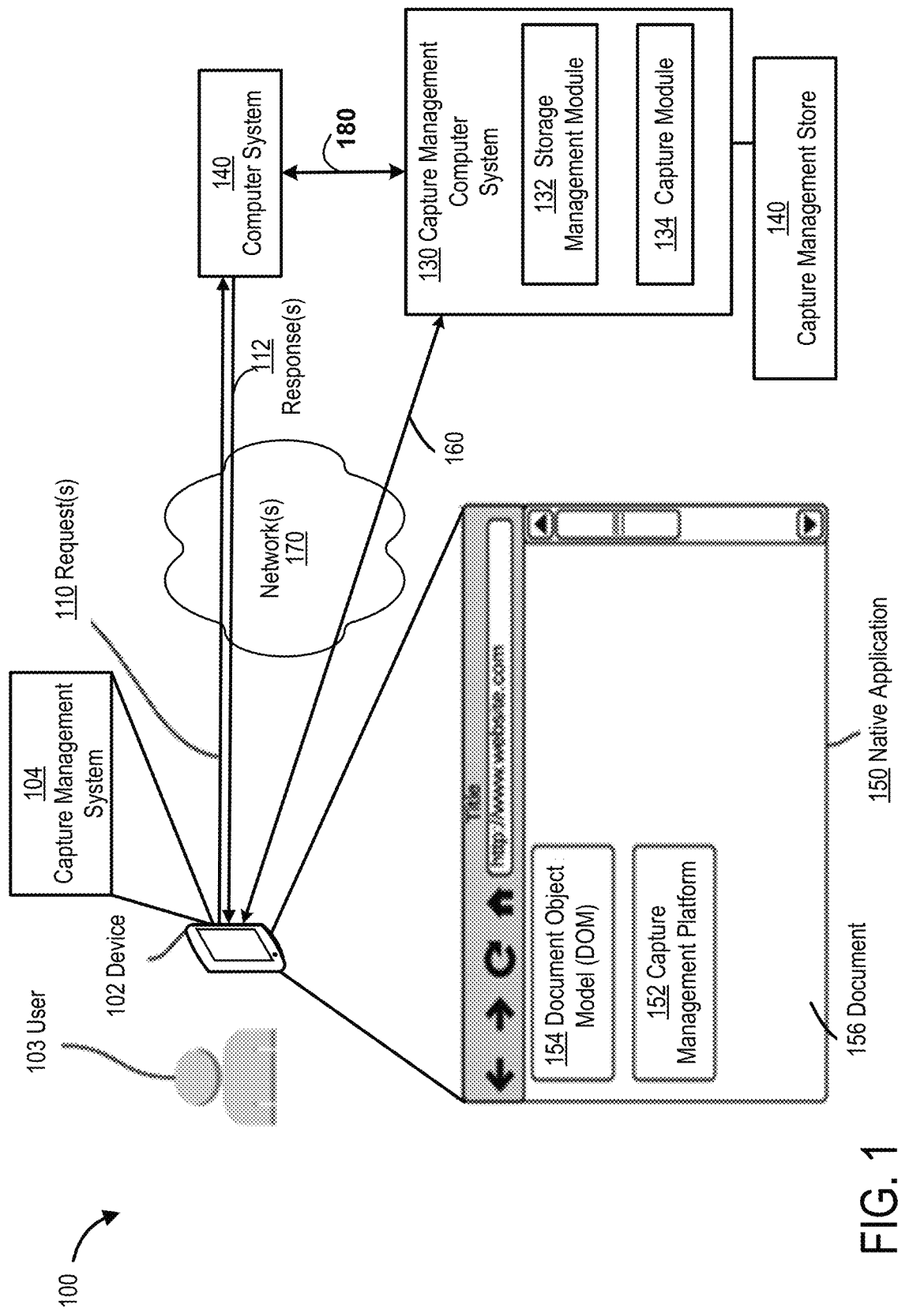
FIG. 1 illustrates a high level architectural diagram of a system according to some embodiments.

FIG. 1 illustrates an example of a system 100 as a high level architectural diagram for a capture management system. One or more of the below-described techniques may be implemented in or involve one or more computer systems. System 100 is not intended to suggest any limitation as to scope of use or functionality of described embodiments.

The system 100 may include one or more "clients" or "client systems" (e.g., a client application or a client device), such as a device 102. In some embodiments, such as one shown in FIG. 1, device 102 is a mobile device (e.g., a mobile phone device). Challenges disclosed herein may be particularly prevalent on mobile devices.

System 100 may include a computer system 140 (e.g., a web server computer). Clients may be operated by users, such as user 103. Computer system 140 may be operated by a user (e.g., an administrator). Clients can communicate with computer system 140 to exchange data via one or more communication networks (e.g., a network 170). For example, a client may exchange data with computer system 140 to provide an application (e.g., a mobile native application) at the client. The communication with computer system 140 for an application may support execution of the application, configuration of the application, access to the application, loading of data for the application, or any other operation performed by or for the application. Examples of a communication network include, without restriction, the Internet, a wide area network (WAN), a local arear network (LAN), an Ethernet network, a public or private network, a wired network, a wireless network, and the like, and combinations thereof.

Communications between clients and computer system 140 may include one or more requests 110 and/or one or more responses 112. A communication session (e.g., a web session) may be established between device 102 and computer system 140 to exchange communications via network 170. As explained above, the communications may support providing an application at a client. The communications may be specific to one or more criteria of a device (e.g., device 102). The criteria may include, without restriction, a type of a device, a type of platform, a type of language, a type of application, other criteria of a device, or a combination thereof. For example, the communication(s) between computer system 140 and device 102 may be specific to a native application for a particular environment (e.g., a platform or a device) on device 102.

Computer system 140 may be implemented to store resources, such as electronic documents (e.g., a collection of web documents for a website). In some embodiments, clients may communicate with computer system 140 by transmitting a request 110 along network 170 to computer system 140. For example, a request from device 102 to computer system 140 may be a request for a resource, such as a web document accessed at a uniform resource locator (URL) at device 102. A response 112 from computer system 140 to device 102 may be a response providing the web page requested by device 102. The communications exchanged in system 100 may be transmitted via one or more data packets. Data packet(s) that are received may be reassembled to yield a communication, such as a request or a response. Requests and responses may be transmitted via one or more network devices.

Requests and responses may include data, such as consumer data and/or enterprise data. The data may include resources, such as electronic documents (also referred to herein as "documents"). A document may include content to be provided at a client, such as via an application. Data may be received from a computer system, data may be sent to a computer system, data may be processed by a computer system, or combinations thereof. Data may be communicated between a client and computer system 140 to provide an application at the client to operate. An application may be provided at a client, by the client, computer system 140, or a combination thereof. For example, data may be communicated between a client and computer system to provide an application, so as to configure the application, execute the application, access the application, load data for the application, or perform any other operation by or for the application.

Enterprise data may be distinguishable from consumer data for consumer applications and/or services. In certain embodiments, enterprise data may include data processed, stored, used, or communicated by an application or a service executing in an enterprise computer system. For example, data in a communication may include business data (e.g., business objects) such as JSON (JavaScript Object Notation) formatted data from enterprise applications, structured data (e.g., key value pairs), unstructured data (e.g., internal data processed or used by an application, data in JSON format, social posts, conversation streams, activity feeds, etc.), binary large objects (BLOBs), documents, system folders (e.g., application related folders in a sandbox environment), data using representational state transfer (REST) techniques (referred to herein as "RESTful data"), system data, configuration data, synchronization data, or combinations thereof. In some embodiments, data in communications 110, 112 may include a resource such as a document as referenced herein. A resource, such as a document, may include a document extended markup language (XML) files, HTML files (e.g., a web page), JavaScript files, visual assets, configuration files, media assets, a content item, etc., or a combination thereof. For example, a resource may be a web page in an HTML format referenced by uniform resource information (URI), e.g., a uniform resource locator (URL). A BLOB may include a collection of binary data stored as a single entity in a database management system, such as an image, multimedia object, or executable code, or as otherwise known in the art.

System 100 can include a capture management computer system 130 (also referred to herein as a "capture management system," "capture system," or "capture computer system") that performs techniques disclosed herein for capturing, storing, and regenerating views at a client, such as a mobile device. A view of an application may be presented or rendered as a resource, content, or information that is visibly seen at a device in the application. Computer system 130 may provide a service or an application that performs techniques disclosed herein. Computer system 130 may be implemented as part of device 102, computer system 140, or a combination thereof. Computer system 130 may be communicatively coupled (e.g., via a network 170) to one or more elements in system 100. For example, computer system 130 may be communicatively coupled to device 102 via connection 160 through network 170. Computer system 130 can be communicatively coupled to computer system 140 via a communication connection 180 through network 170.

Computer system 130 and device 102 may comprise one or more computers and/or servers which may be general purpose computers, specialized server computers (including, by way of example, PC servers, UNIX servers, mid-range servers, mainframe computers, rack-mounted servers, etc.), server farms, server clusters, distributed servers, or any other appropriate arrangement and/or combination thereof. Computer system 130 and device 102 may run any of operating systems or a variety of additional server applications and/or mid-tier applications, including HTTP servers, FTP servers, CGI servers, Java servers, database servers, and the like. Exemplary database servers include without limitation those commercially available from Microsoft, and the like. Computer system 130 and device 102 may be implemented using hardware, firmware, software, or combinations thereof. In one example, computer system 130 may include or implement a service or a product (e.g., a computer program product) provided by Quantum Metric, LLC. In various embodiments, computer system 130 and device 102 may be configured to run one or more services or software applications described in the foregoing disclosure. For example, computer system 130 and device 102 may perform processing as disclosed herein according to an embodiment of the present disclosure.

In some embodiments, computer system 130 and device 102 may be implemented using a computing system comprising one or more computers and/or servers that may include those described above. The computing system may be implemented as a cloud computing system. Computer system 130 and device 102 may include several subsystems and/or modules, including some, which may not be shown. Computer system 130 and device 102 may have more or fewer subsystems and/or modules than shown in the figure, may combine two or more subsystems and/or modules, or may have a different configuration or arrangement of subsystems and/or modules. For example, computer system 130 may include storage management module 132 and capture module 134. In another example, device 102 may include capture management system 104. Subsystems and modules of computer system 130 and device 102 may be implemented in software (e.g., program code, instructions executable by a processor), in firmware, in hardware, or combinations thereof. The subsystems and/or modules of computer system 130 and device 102 may be implemented to perform techniques disclosed herein. In some embodiments, the software may be stored in a memory (e.g., a non-transitory computer-readable medium), on a memory device, or some other physical memory and may be executed by one or more processing units (e.g., one or more processors, one or more processor cores, one or more GPUs, etc.). Computer-executable instructions or firmware implementations of the processing unit(s) may include computer-executable or machine-executable instructions written in any suitable programming language to perform the various operations, functions, methods, and/or processes disclosed herein. Computer system 130 and device 102 may each store program instructions that are loadable and executable on the processing unit(s), as well as data generated during the execution of these programs. The memory may be volatile (such as random access memory (RAM)) and/or non-volatile (such as read-only memory (ROM), flash memory, etc.). The memory may be implemented using any type of persistent storage device, such as computer-readable storage media. In some embodiments, computer-readable storage media may be configured to protect a computer from an electronic communication containing malicious code. The computer-readable storage media may include instructions stored thereon, that when executed on a processor, perform the operations disclosed herein.

Computer system 130 and device 102 may each also include or be coupled to additional storage, which may be implemented using any type of persistent storage device, such as a memory storage device or other non-transitory computer-readable storage medium. In some embodiments, local storage may include or implement one or more databases (e.g., a document database, a relational database, or other type of database), one or more file stores, one or more file systems, or combinations thereof. For example, computer system 130 may be coupled to or may include one or more data stores, such as capture management store 140. Capture management store 140 may include a library of information including computer-executable or machine-executable instructions, code, software, instructions, or other computer-readable information. The information stored in capture management store 140 may be written in any suitable programming language to perform the various operations, functions, methods, and/or processes disclosed herein. Device 102 may include a data store, which may store capture management system 104. Capture management system 104 may be configured in a library of information on a device. The library may include computer-executable or machine-executable instructions, code, software, instructions, or other computer-readable information. The information stored for capture management system 104 may be written in any suitable programming language to perform the various operations, functions, methods, and/or processes disclosed herein. The data store(s) may store templates, edit scripts, and other information for the operations disclosed herein. The data store(s) may be implemented to store data using one or more data structures (e.g., a hash table). The data store(s) may be accessible to perform search and retrieval of data stored in the data store(s). It may also include analysis logic to select a template for responses as well as logic to store the edit scripts with respect to the template, as exampled and described in some embodiments of this disclosure. The memory and the additional storage are all examples of computer-readable storage media. For example, computer-readable storage media may include volatile or non-volatile, removable or non-removable media implemented in any method or technology for storage of information such as computer-readable instructions, data structures, program modules, or other data.

Computer system 130 and device 102 may provide other services and/or applications in a virtual or non-virtual computing environment. For example, computer system 130 may be configured to run one or more of these services or software applications described in the foregoing disclosure. Such services may be offered on-demand to users of device 102. In some embodiments, a specific instantiation of a service provided by computer system 130 may be referred to herein as a "service." Users operating device 102 may use one or more applications to interact to utilize the services or applications provided by computer system 130. Services may be offered as a self-service or a subscription. Users can acquire the application services without the need for customers to purchase separate licenses and support. Examples of services may include a service provided under a Software as a Service (SaaS) model, a web-based service, a cloud-based service, or some other service provided to device 102 via network 170. A service made available to a user via network 170 (e.g., a communication network) from computer system 130 is referred to as a "cloud service." In some embodiments, computer system 130 may host an application, and a user may, via network 170, access the application at device 102 on demand. Users operating device 102 may in turn utilize one or more applications to interact with computer system 130 to utilize the services provided by subsystems and/or modules of computer system 130.

In some examples, a service may be an application service may be provided computer system 130 via a SaaS platform. The SaaS platform may be configured to provide services that fall under the SaaS category. The SaaS platform may manage and control the underlying software and infrastructure for providing the SaaS services. By utilizing the services provided by the SaaS platform, customers can utilize applications executing in computer system 130, which may be implemented as a cloud computing system. The cloud computing system may be implemented as a cloud-based infrastructure that is accessible via network 170. Various different SaaS services may be provided.

Device 102 may include or be coupled to a display. Device 102 may provide access to one or more applications (also referred to herein as an "application program"), such as application 150. An application may be presented in a view on a display device at device 102 or accessible to device 102. An application may be executing on a device (e.g., device 102), computer system 130, computer system 140, or a combination thereof. In some embodiments, an application may be accessed from one location and executed at a different location. For example, an application may be accessible at device 102 as a service, but the application may be executed at computer system 130. An application may comprise information such as computer-executable or machine-executable instructions, code, or other computer-readable information. The information may be written in any suitable programming language to perform the various operations, functions, methods, and/or processes disclosed herein. The information may be configured for operation of the application as a program. Examples of applications may include, without restriction, a document browser, a web browser, a media application, or other types of applications.

In some embodiments, an application may be a device-specific. Applications may be developed as native applications for access on particular devices that have a configuration that supports the applications. An application (e.g., a native application) may be configured for a particular type of platform and/or particular type of device. As such, an application may be implemented for different types of devices. Devices may be different for a variety of factors, including manufacturer, hardware, or supported operating system. An application may be written in different languages, each supported by a different type of device and/or a different type of platform for the device. For example, an application for a mobile device may be a mobile application, or mobile native application, that is configured for use on a particular mobile device.

Applications may generate a view of information, content, and resources, such as documents. For example, application 150 may display content as a view at device 102. The view may be rendered based on one or more models. For example, a document 156 may be rendered in an application, such as a web browser using a document object model (DOM). The view may be generated as an interface, e.g., a graphical user interface (GUI), based on a model. The document may be rendered in a view according to a format, e.g., a hyper-text markup language (HTML) format. The interface for the view may be based on a structure or organization, such as a view hierarchy.

Capturing or recording a view (e.g., a display of content or information) as it is displayed in an application (e.g., mobile application 150) at a device (e.g., device 102) at any given time is challenging. The rapid development of applications, which are configured for different platforms for different devices, had led to a significant growth in applications. The volume of applications and the different variations of those applications across many different types of devices, had led to an increase in different problems encountered using those applications. The resolve these problems, users are trying to recreate or determine the stage in which the applications encountered an issue. At any given time, it may be difficult for a person to identify an error or a problem in a view of an application, which may be dependent on the application and/or the device at which the application is being used. Techniques are disclosed to efficiently and accurately capture the view(s) presented in an application.

A capture management system may be implemented in system 100. The capture management system may be implemented by capture management system 104, capture management platform 152, capture management computer system 130, or a combination thereof. The capture management system may be invoked by a user as a service or may be automatically implemented. As a service, computer system 130 or device 102 may be operated to control operation of the capture management system. The capture management system may include or be implemented including a capture management platform. The platform may include a software development kit (SDK). The capture management system may operate on a client, such as device 102. In some embodiments, the capture management system may be initiated for operation at a client, such as device 102, but all or some operation of the capture management system may be implemented server-side, such as computer system 130.

The capture management system can capture, or record, a view in an application, e.g., native application 150, presented at device 102. In FIG. 1, the view may be a view of a document rendered in native application using a DOM 154. A DOM may be received from a source of the content (e.g., document 156) displayed in application 150. For example, DOM 154 may be received from computer system 140. A view may be generated for display in application 150 based on content obtained from computer system 140. In some embodiments, application 150 is a native application, written using a language readable by device to render a resource, e.g., document 156, in application 150. The view in application 150 may change rapidly due to interaction with the application 150.

In at least one embodiment, the capture management system may be implemented at the client (e.g., client-side) at the device where views are to be captured. Capture management system 104 may be implemented in a variety of ways on device 104. Capture management system 104 may be implemented as part of device 102, such as instructions accessible in a library configured on device 102. Capture management system 104 may be implemented in firmware, hardware, software, or a combination thereof. Capture management system 104 may provide a platform or an interface (e.g., an application programming interface) for an application to invoke capture management system 104 or for capture management system 104 to monitor operations performed by application 150. In some embodiments, capture management system 104 and/or capture management platform 152 may be an application (e.g., an agent) resides on device 102. Capture management system 104 and/or capture management platform 152 may be implemented using code or instructions (e.g., JavaScript) that is embedded in an application. In some embodiments, capture management system 104 and/or capture management platform 152 may be received from computer system 130. Capture management system 104 and/or capture management platform 152 may be deployed to device 102 as part of a service provided by computer system 130.

In some embodiments, the capture management system for capturing views in an application may be implemented all or in part by one or more modules of capture management computer system 130, such as capture module 134. Any of the modules in capture management computer system 130 may be implemented to be invoked from an application, capture management system 104, capture management platform 152, or a combination thereof.

An application, such as application 150, for which views are to be captured, may be implemented to include all or some instructions of capture management system 104. Capture management system 104 may be implemented for different types of devices and/or different types of platforms on devices. The capture management system may be configured specific to a platform on a device so as to utilize specific functions of the platform to capture views in an application. In one example, an application may be configured to have instructions that are invoked in different scenarios to call capture management system 104 accessible on device 102. Application 150 may include capture management platform 152 to invoke capture management system 104. In another example, capture management platform 152 may be embedded in application 150. In some embodiments, application 150 may be implemented with instructions that invoke capture management system 104 through a platform or interface provided by capture management system 104. For example, different functions for generating views in an application may be configured to call capture management system 104. Capture management system 104 may monitor a view based on the call from application 150, and then capture management system 104 may perform or invoke the original function(s) that were initially called by application 150.

Alternatively, or additionally, capture management system 104 or capture management platform 152 may listen for notifications by a particular application that is to be monitored. Capture management system 104 may utilize feature of a platform or device 102 to listen for notifications, such as notifications provided about applications by an operating system on device 102. The notifications may be configured for a particular application. Based on the notifications, capture management system 104 can determine a view in an application, and whether the view has changed. In some embodiments, capture management system 104 or capture management platform 152, may intercept a call from application 150 to modify or change a view. The call may be intercepted based on a notification about an event related to the change in view. Capture management system 104 or capture management platform 152 may determine information about the view based on the call, and then proceed with invoking the original call that was detected.

The capture management system 104 may monitor interactions with the application or content in the application to determine a change in the view. For example, the capture management system 104 can determine when an interactive element (e.g., a field) changes and/or when a new view (e.g., an interface) or the existing view is presented. In addition to the techniques disclosed herein, the techniques disclosed herein may be further implemented to capture or record the view presented in an application. For example, the capture management system may determine events associated with presenting a view in an application. The events may be determined using a model associated with displaying content, e.g., a document, in the application. The events may be identified by a node or other information in the model associated with the view. Examples of events include, without restriction, an interaction with the application or a change in a document displayed in the application.

The capture management system may be implemented in different ways to capture the view in an application at any given time. The capture management system may monitor a view to determine an organization of the view. The view may be monitored according to a variety of techniques disclosed herein. The view may be monitored to determine any changes in the view. The view may be monitored to determine the view, such as a view hierarchy of the view in an application, a layout of the view, a structure of the view, one or more display attributes of the view, content of the view, lines in the view, or layer attributes in the view. Monitoring a view may include determining whether the view is created, loaded, rendered, modified, deleted, updated, and/or removed. Monitoring a view may include determining whether one or more views (e.g., windows) are added to the view.

The capture management system may generate data that defines a view presented at an application. The data may be generated a translation, or capture of a view at an application. The capture management system may generate the view as a layout or page representation of the view. The data may describe or indicate the view. The data may be generated in a format (e.g., HTML) that is different from a format in which the view in the application is written. For example, for multiple applications that are similar, but configured for different native environments, the view from each of the applications may be translated by capture management system into data having a single format, e.g., HTML. The language may have a format that is different from a format of the language in which the view is generated in the application. The language may be generic or commonly used such that a computer system can process the data without a dependency on a particular language. Based on the information determined from monitoring a view at a device, the capture management system may generate the data having a structure and the content according to the structure as it was displayed at the device. For example, the data may be generated in HTML and may have a structure (e.g., a layout and/or an order) as to how content was seen in a view, such as headers, titles, bodies of content, etc. In some embodiments that data may be generated in the form of an electronic document for one or more views. The data may be generated to include attributes defining the view such as display attributes of the content. The data may be generated to include the content that was visibly seen in the view according to the structure of the view. In some embodiments, data may be generated for each distinct view identified in an application.

The generated data may be used to recreate a view at a document. The techniques disclosed herein may be used to recreate the view in an application. As disclosed herein, some content may change minimally between documents. With regard to applications, some views may change in a limited amount. As discussed below, techniques disclosed herein may be applied to the capture management system to detect differences between views based on the generated data, and to efficiently store the data such that the data is not duplicated for storage.

In some embodiments, the capture management system may generate data based on a model defining the view captured in an application. The model may be defined based on attributes identified in the view. The model may be a copy, or duplicate (e.g., a shadow) of a model for the view in the application. For example, capture management system 104 may generate a shadow DOM for a DOM that is identified for a view in an application.

The capture management system may implement techniques for compact data storage and efficient search thereof of the views that are determined from monitoring applications. Data may be generated for one or more views in an application. The data may be generated in a format of a resource, such as an electronic document. The techniques disclosed herein can be implemented for compact storage of documents that are generated. Using such techniques, the capture management system can determine the differences between documents representing views, to determine which, if any, have changed and what those changes are. The differences can be stored and easily retrieved using techniques disclosed herein. In some embodiments, the techniques performed at a server, can be performed by capture management computer system 130, in particular storage management module 132. Data that is generated and managed by capture management computer system 130 may be stored in capture management store 140. When translating a view from multiple applications, which are similar, but configured differently for different native environments on devices, similar or identical views can be stored as a single instance and the differences can be stored separately. Techniques disclosed herein can be used to identify/compare differences between views generated by similar applications configured for different native environments.

In some embodiments, the capture management system can implement techniques herein for document capture using client-based delta encoding with server. Specifically, the techniques disclosed herein for device 102 can be implemented herein for device 102, and techniques disclosed for computer system 130 can be implemented herein for computer system 130. The techniques disclosed herein can be implemented for document capture based on the documents generated by capturing a view in an application. Techniques disclosed herein can be used to identify/detect differences between views generated by similar applications configured for different native environments.

II. Processes for Capture Management

Examples of operations disclosed herein may be described as a process, which may be depicted as a flowchart, a flow diagram, a data flow diagram, a structure diagram, a sequence diagram, or a block diagram. Although such diagrams may describe operations as a sequential process, all or some of the operations may be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination may correspond to a return of the function to the calling function or the main function.

The processes disclosed herein may be implemented in software (e.g., code, instructions, program) executed by one or more processing units (e.g., processors cores), hardware, or combinations thereof. The software may be stored in a memory (e.g., on a memory device, on a non-transitory computer-readable storage medium). In some embodiments, the processes depicted in flowcharts herein can be implemented by elements in system 100 including the capture management platform 104 and the capture management system 130 in FIG. 1. The particular series of processing steps in this disclosure are not intended to be limiting. Other sequences of steps may also be performed according to alternative embodiments. For example, alternative embodiments of the present disclosure may perform the steps outlined above in a different order. Moreover, the individual steps illustrated in the figures may include multiple substeps that may be performed in various sequences as appropriate to the individual step. While processing may be described with respect to a single application on a single device, such processing may be performed for multiple applications on one or more devices. Furthermore, additional steps may be added or removed depending on the particular applications. One of ordinary skill in the art would recognize many variations, modifications, and alternatives.

In an aspect of some embodiments, each process can be performed by one or more processing units. A processing unit may include one or more processors, including single core or multicore processors, one or more cores of processors, or combinations thereof. In some embodiments, a processing unit can include one or more special purpose co-processors such as graphics processors, digital signal processors (DSPs), or the like. In some embodiments, some or all of processing units can be implemented using customized circuits, such as application specific integrated circuits (ASICs), or field programmable gate arrays (FPGAs).

a. Process for View Capture and Storage on Mobile Devices

Figure 2:
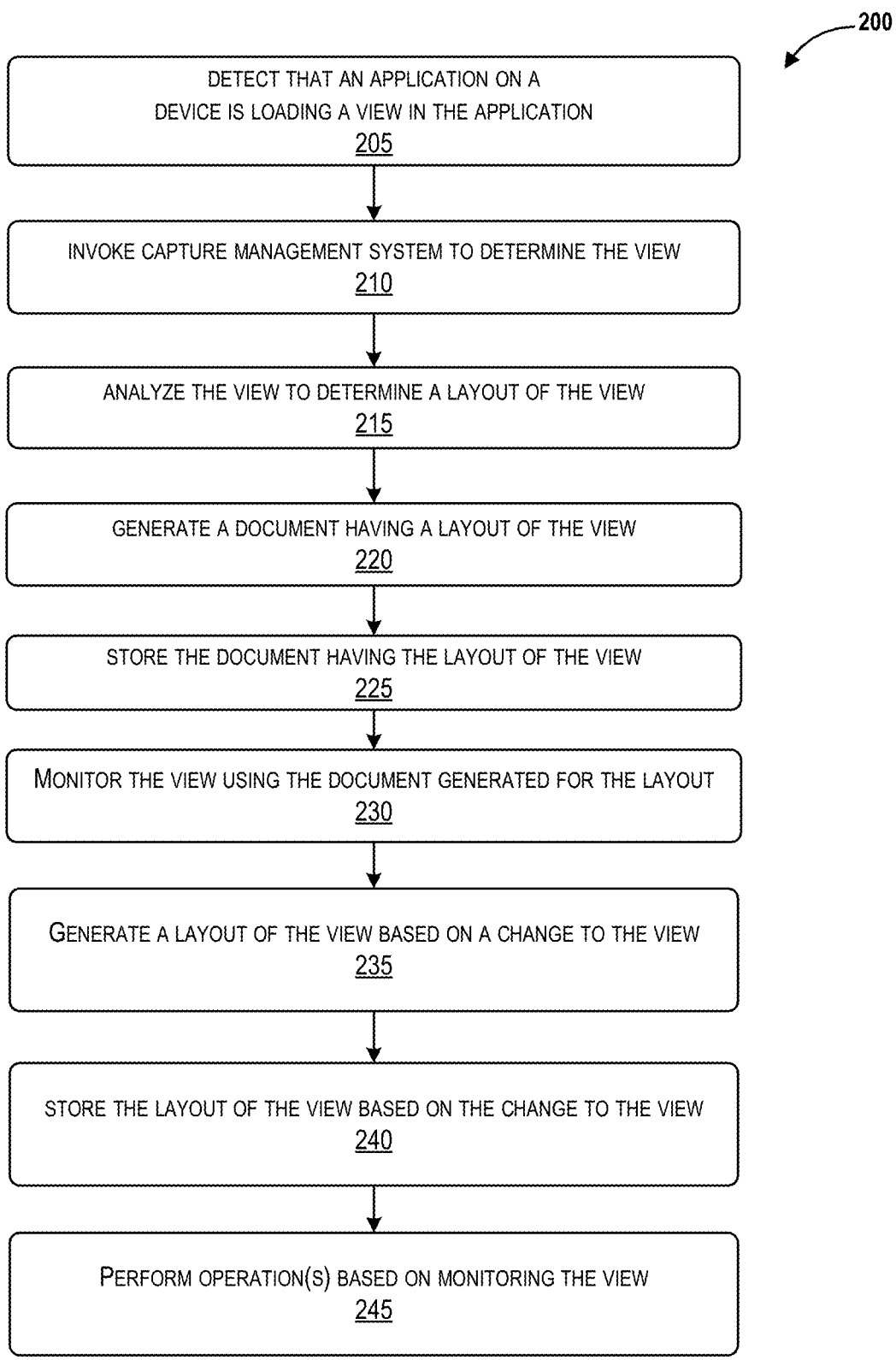
FIG. 2 illustrates an example high-level workflow of a process for view capture in an application according to some embodiments.

Now turning to FIG. 2, a flowchart 200 of a process for view capture and storage of an application according to some embodiments. Many applications on mobile devices are native applications configured for a specific environment on a device. Many different variations of applications are being created for different native platforms on mobile device. It is increasingly becoming difficult to detect a view that an application provides at any given point to identify issues with presentation of content in the application. The process illustrated and described below for flowchart 200 may be implemented by capture management platform 104 at a device (e.g., device 102), a capture management computer system 130, or a combination thereof. Flowchart 200 may include all or some of steps 205, 210, 215, 220, 225, 230, 235, 240, and 245.

At step 205 by detecting that an application on a device is loading a view in the application. The application may be a native application based on an environment supported by the device (e.g., a mobile device). In some embodiments, the view may be detected after all or part of the view is loaded.

In at least one embodiment, the application may be configured or modified with program code to detect that the application is presenting a view (e.g., loading a view in the application). The program code may be part of a capture management system. The capture management system may be implemented, server-side as part of a capture management system 130 of FIG. 1, a platform or interface (e.g., capture management platform 152), or a combination thereof. The program code may invoke a routine or communicate with the interface to call a function to monitor presentation of a view in the application. In some embodiments, an application or the environment may include the program code to implement techniques for capture management.

In at least one embodiment, the device may include a capture management system that can monitor notifications in the device to detect a view that us loading in an application. The capture management system may be configured to operate in a native environment on the device. Using the native environment, the capture management system can register for one or more types of notifications, such as notifications about view loading. The capture management system can register for notifications with the native environment on the device, independent of an application for which views are to be monitored. For example, the capture management system may be implemented to monitor a view of display on a mobile device, irrespective of a particular application being used. In some embodiments, the capture management system can be implemented to monitor and detect change in views in the native environment on the mobile device. Notifications may be provided by an environment on the device, such as an operating system. The operating system may include a platform that supports registration for notifications. In some embodiments, the capture management system may communicate with the application to request an update about the display of views in the application.

At step 210, based on detecting that the view is loading, a capture management system is invoked to determine the view that is loaded. The capture management system may receive a request from the application or the device. The capture management system may listen for an event, and be invoked based on the event. The event may be loading a view, a change in a view, a notification about the view, or communication (e.g., a request) for data related to or for facilitating loading of a view. The view may be determined after all or part of the view is loaded. In some embodiments in which an application includes code to detect the view is loaded, the application may invoke a call (e.g., execute code) to call the capture management system. The call may be invoked through a platform (e.g., capture management platform 152) or interface provided by the capture management system. In some embodiments in which the capture management system listens for notifications, the capture management system may initiate its own process to determine the view.

At step 215, the view in the application is analyzed to determine a layout of the view. The view may be analyzed using a model (e.g., a DOM) or other data structure that may be accessible to define the view. In some embodiments, the view may be based on a model received from the application or a computer system (e.g., computer system 140) that provides the application. The computer system may be a web server computer that provides content and data for a view application(s), and/or the application(s) themselves to a client (e.g., device 102). The view may be analyzed to determine an organization of the view, such as a view hierarchy. A model for the view may be used to determine the view hierarchy. The view may be analyzed as it is loaded. Analyzing the view may include identifying and monitoring communication for rendering a view based on a DOM. For example, communication (e.g., requests and responses) may be monitored for resources. Examples of resources include, without limitation, content, data, program code (e.g., JavaScript), cascading style sheets (CSSs), images, video, or combinations thereof.

In some embodiments, the view may be converted into a transportable data format (e.g., a data layer). The transportable data format may be HTML or other markup language that may be presented in a graphical interface.

In some embodiments, the program code for an application may be configured to utilize a capture management system, e.g., capture management system 104. The application may be configured with, or configured to invoke, program code of the capture management system. The application may be configured with program code (e.g., a hook) that intercepts actions to display all or part of the view. The program code may call the capture management system to notify it about an action to display the view. The capture management system may be invoked through an interface or platform (e.g., a source development kit) provided by capture management system. The platform may be capture management platform 152. The capture management system may be called in a variety of ways. The capture management system may be notified based on detecting communication for one or more resources for a view. The resources may be defined based on a DOM for a view.

The program code for the application may be configured to notify the capture management system upon each action performed (e.g., each function to draw a part of the view) to load the view. Actions may include user interactions with an interface (e.g., a graphical interface) of the application. Alternatively, or additionally, the capture management system may be integrated or configured to operate with the application such that the capture management system can intercept or detect a call for each action to display a view. The view of the application may be analyzed based on each action that is monitored for the view. In some embodiments, the view of the application may be analyzed based on the capture management system monitoring actions by the application to display the view. The capture management system may receive notifications from the application and/or the environment of the device about actions to display a view for the application.

Using the techniques disclosed herein, the capture management system can analyze the view of the application based on the action(s) performed to load the view. The capture management system can be implemented such that it stores information that indicates a display in the view based on the action performed. The display may be used to determine a portion of the view. In some embodiments, the capture management system can map a layout of the view based on analyzing each action for loading the view. The capture management system can analyze or use a view hierarchy to determine the layout based on the actions for loading the view.

In some embodiments, the capture management system can intercept each call for action in generating the view in the application. The capture management system may perform each function to generate (e.g., draw) the view after intercepting the call. The capture system can capture all the actions, and then perform the actions to generate the view after all actions are captured.

At step 220, a layout of the view may be generated as a document in a format of a layout determined by analyzing the actions to load the view. In some embodiments, the capture management system may recursively perform actions (e.g., drawing actions) to generate the layout. A layout may be generated based on analyzing the view. The layout may be in a format (e.g., HTML) that is different from a format of the view in the application. The layout may be an electronic document, e.g., a web document, which can be used to display the view in other applications that can understand the format. The capture management system may analyze the view, including a presentation of content, such as a format, lines, background, display attributes, layer attributes (e.g., opaqueness, edge style, cropping, and rotation). The features determined from the analyzed view may be stored in the layout generated based on the view. In some embodiments, the capture management system may determine a model (e.g., a DOM) for the layout. The model may be a copy or duplicate (e.g., a shadow) of a model used for rendering the view. The model may be generated by the capture management system based on analysis of the view. The layout may be generated to include the content in the view. The content in the view that is to be protected, such as security information may be stored in the layout after encryption of the content. Any known techniques for encryption may be used to secure confidential or private information in the view.

At step 225, the layout generated in a document may be stored. The layout may be stored as a document using any of the techniques disclosed herein. For applications that are similar, but having different program code for different native environments, the capture management system can generate a single layout. The layout may include an indication of differences between the layout determines across the applications in different native environments.

At step 230, one or more views on the mobile device may be monitored. Specifically, the view(s) based on the document(s) generated at step 220 may be monitored using the document(s). The view(s) may be monitored based on notifications as disclosed herein. The document having the layout may be compared to another document having a layout of a previous view (e.g., a view at an earlier time period). The documents may be compared to determine a change in the layout using techniques disclosed herein.

The view(s) may be monitored to detect a change in display at a mobile device, such as a display of an application. The change may be an update to the view or may be a substantial change to the view (e.g., a new view). The change may be detected based on an interaction with the view that results in the view being modified or updated. The view may change based on interaction with the application. Similar to the techniques disclosed above, the change in the view may be detected by the application notifying the capture management system, the application calling the capture management system, the capture management system detecting the change in the view by monitoring interaction with the view, the capture management system receiving a notification about the change in the view, or a combination thereof. The capture management system can determine a change in the layout of the view, and if the view changes substantially, the capture management system can determine a new layout for the view. In some embodiments, the change in a view may be determined at the device by capture management platform 152. Capture management platform 152 may operate in communication with the capture management system 130.

At step 235, a layout of the view may be generated based on the change. Based on the change, the capture management system can determine the portion of the view that changed. Depending on a degree of the change, the layout previously generated by the capture management system may be modified to reflect the change. In some embodiments, the capture management system may determine the change as a difference from the layout. The change may be generated in a new layout or a document that is related to the document having the layout of the view before the change. The change may be determined using techniques disclosed below.

At step 240, the layout of the view generated based on the change may be stored. The layout may be stored as a new document or as a different from the previous layout. The change may be stored using techniques disclosed below.

At step 245, one or more operations may be performed based on monitoring the view. For example, an operation may be performed based on detecting a change in the view. Operations may include notifying a system (e.g., capture management system 130 or computer system 140) about a change in the view, displaying information about a change in the view (including the view or a layout of the view), and/or adjusting operation of a computer system (e.g., computer system 140).

In at least one embodiment, an operation may be causing a notification to be provided about a change in the view. A notification may include a message with instructions that cause one or more operations to be performed at a device or system that receives the message. Capture management platform 152 may perform an operation to cause a notification to be displayed on a device (e.g., device 102) about a change in the view. The notification may cause an update to the view on the device. For example, the application or the device may change or inhibit functionality that caused the change in the view, which may be associated with an error. The capture management platform 152 may provide a graphical interface that displays and/or shows information about views on a device, including a change in a view. Alternatively or additionally, capture management platform 152 may send a notification to computer system 140 or capture management system 130. The notification may be logged by the computer system 140. Computer system 140 may adjust operation of the application to reduce an error or a problem based on a change in view. The change in view may be useful for detecting an issue or a problem with the view. The notification to capture management system 130 may cause capture management system 130 to display information about the view including a change in the view. The information about the view may be displayed to enable a user (e.g., a provider of an application) to monitor applications; in particular, detect issues with using an application. Upon capture management system 130 detecting a change in a view, capture management system 130 may send notifications to devices (e.g., device 102) and/or computer system 140. The notifications may operate similar to examples described above for notifications provided by capture management platform 152.

In at least one embodiment, an operation may be displaying, in a graphical interface, one or more views presented in an application. The views may be presented as captured or may be displayed as a layout generated for the view. A display of a view may enable a user (e.g., an operator) of an application to view the view seen at the actual time the application was operated. The view may enable the user to determine or identify problems with accessing the application, such as problems with display and operation of an application. The layout generated for a view may be used to generate or reproduce a view of the application. A view may be regenerated based on a layout using techniques disclosed herein.

In at least one embodiment, the capture management system (e.g., capture management system 130 or capture management platform 152) may communicate with a computer system, e.g., computer system 140, to provide an instruction or a message about a view in an application. The communication may include an instruction or other information about a change to a view to reduce or eliminate an error with the view. The information may include a layout of a view and/or information about one or more issues or errors detected in a view. The computer system may adjust operation based on the communication by the capture management system.

b. Process for Client-Side Capture

A capture management system can implement techniques for server-side capture to capture the HTML/DOM sent to the browser on a client device. But, before the browser has completed loading the DOM sent from the server and captured server-side, the HTML may be modified using, perhaps, a client-side plugin or server-delivered scripts. Modern browser technology does not provide a method to distinguish which DOM nodes were modified client-side and which were delivered from the original HTML sent from and captured on the server-side. With this regard, using the full tree DOM path to address changes may lead to errors during replay and analysis when client-side scripts modify the DOM during the DOM load in the browser and prior to the capture management platform loading.

To address this challenge, embodiments can determine identification information of a node associated with an event, and save that identification information with an event record. As an example of using identification information, embodiments can direct the capture management platform to use the nearest uniquely identified ancestor node to uniquely name the path to the current modification. A uniquely identified node is a node that can be unambiguously identified without using a DOM path, such as an HTML element with an "id" attribute field. An example embodiment of this process is detailed in U.S. Non-Provisional patent application Ser. No. 14/984,102, entitled "ACCURATE AND EFFICIENT RECORDING OF USER EXPERIENCE, GUI CHANGES AND USER INTERACTION EVENTS ON A REMOTE WEB DOCUMENT" and filed on Dec. 30, 2015, which is incorporated by reference for all intents and purposes. Embodiments can work backwards from the node to find the closest uniquely identifiable path.

Figure 3:
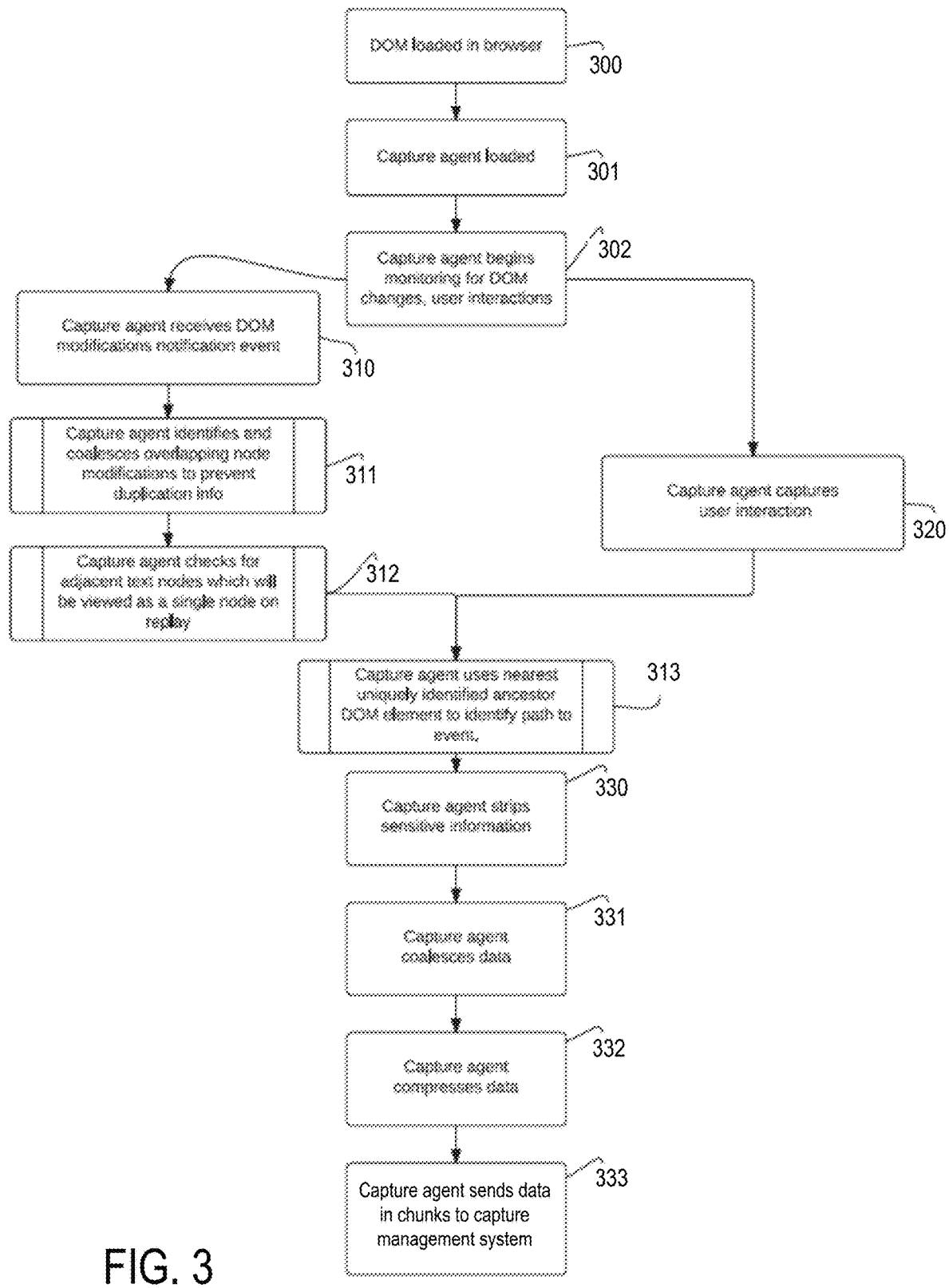
FIG. 3 depicts an example workflow of one embodiment of a capture management system on a client device according to some embodiments.

FIG. 3 illustrates an example workflow of one embodiment of the client-side capture management platform. The example workflow can be used a method for tracking events associated with a web document on a client device.

At block 300, the DOM is loaded in the browser 300. Then, at block 301, the capture management platform (e.g., a capture agent) is loaded. For example, the browser can begin loading resources, including the HTML document, JavaScript, images, stylesheets and other data required to render the page. The HTML document parsed by the browser can include instructions to load the capture management platform software into the browser.

At block 302, the capture management platform begins monitoring for DOM changes (e.g., graphical user interface changes) and user interaction events. While processing changes and events, the capture management platform may use memory available within the browser, or a permanent storage mechanism provided by the browser. Some events, such as mouse movements, may be sampled to a specific time resolution, such as 0.1 seconds, to reduce the amount of data collected. Other events, such as a mouse click, may not be sampled to ensure an accurate representation of the user's interactions.

At block 310, when the capture management platform receives a DOM modification notification event, the capture management platform begins to process the changes. The DOM modification notification event may contain multiple DOM changes. As examples, the DOM modification can include an addition of one or more nodes in the DOM, a removal of one or more nodes in the DOM, or a modification to one or more existing nodes in the DOM.

At block 311, to efficiently process the changes within the modification notification event, the capture management platform ignores children node modifications for ancestor nodes which were modified and which required the DOM content to be sent to the server-side capture management system 130. An example embodiment of a process for uniquely identifying a DOM node in the DOM tree is detailed in U.S. Non-Provisional patent application Ser. No. 14/984,102, entitled "ACCURATE AND EFFICIENT RECORDING OF USER EXPERIENCE, GUI CHANGES AND USER INTERACTION EVENTS ON A REMOTE WEB DOCUMENT" and filed on Dec. 30, 2015, which is incorporated by reference for all intents and purposes.

At block 312, the capture management platform looks for adjacent text nodes in additions, modifications, or removals that can be represented as one text node during replay. Example embodiments of these processes for sending and storing changes in a DOM so that the capture management system can replay or analyze the serialized changes are detailed below in U.S. Non-Provisional patent application Ser. No. 14/984,102, entitled "ACCURATE AND EFFICIENT RECORDING OF USER EXPERIENCE, GUI CHANGES AND USER INTERACTION EVENTS ON A REMOTE WEB DOCUMENT" and filed on Dec. 30, 2015, which is incorporated by reference for all intents and purposes.

At block 313, the capture management platform uses nearest uniquely identified ancestor DOM element to identify a path to the event. If the associated node has a unique identification, then an ancestor is not needed. Some embodiments can unambiguously identify a target node of DOM changes by constructing a sequence of node indexes by recursively taking the node index of the target node, then the node index of the target node's parent and so on until a node is reached that can be unambiguously identified through another means, such as the fact that the node is the root node of the entire DOM. In this description, this sequence of node indexes is called a "DOM path". A DOM path that ends with the root node of the entire DOM is called a "full tree DOM path".

At block 330, once the capture management platform has identified modification(s) to send to the server-side capture management system 130, the capture management platform may strip out sensitive information. The sensitive information may include elements such as passwords, credit cards, social security numbers, and other configured sensitive fields. Thus, the capture management platform can strip sensitive information before transmitting the event records to the server-side capture management system.

At block 331, the capture management platform may then assemble and coalesce the data, including meta information such as processing time, load time, and other situational information available within the browser, timestamps, and other information such as errors. It may coalesce the data (e.g., over a period of 5 seconds) by combining similar events and using short identifiers to optimize the information into the smallest amount of data bytes.

At block 332, the capture management platform may compress the data in pre-determined chunks. Various compression algorithms are known to those skilled in the art, which trade time to compress vs compression efficiency. While one compression algorithm may be applicable today given today's CPU processing power available, in the future, a more time consuming algorithm may be more appropriate.

At block 333, the capture management platform may send the data to the server-side capture management system. The capture management system can use the data (e.g., as event records) to replay the changes. For example, the capture management system can identify an event and the corresponding node. The capture management system can then make that change and replay it. After receiving the event records at the server-side capture management system, the capture management system can combine the event records with a server-side captured DOM of the web document to generate a modified DOM from an original unmodified DOM.

In some embodiments, the capture management platform can store the event records in a client storage until the event records are transmitted to the capture management system. The event records can be deleted after sending the event records to the capture management system. Subsequent to deleting the event records, a plurality of additional events associated with nodes in the DOM can be captured. For each of the plurality of additional events, additional identification information of an additional associated node can be determined. The additional identification information can be stored in an additional event record. The capture management platform can transmit the additional event records to the capture management system.

In one embodiment, the client-side capture management platform sends the data at pre-determined intervals or when the document is unloaded in the browser. The data can be sent at pre-determined intervals to ensure data is not lost in the browser or during transit. As another example, the client-side capture management platform can send the data when there are no existing network requests.

At block 320, the capture management platform may also receive user interaction events, such as keyboard entry, document resize, orientation changes, scroll events, mouse movements, or mouse clicks. In the case of keyboard entry, the capture management platform may strip sensitive information from the data (event record) as detailed above. The user interaction data can follow a similar path as for DOM modifications detailed above in block 313 for the capture management platform identifying the DOM node of the target of the events, in block 330 stripping sensitive information, in block 331 coalescing the data, in block 332 compressing the data, and in block 333 sending the data.

As examples, four different ways can be used in order to determine a unique identification. DOM node identifiers can be used. Embodiments may potentially use sibling or ancestor node identifiers. If the current node is not uniquely identified, one can go up to parents. Once embodiments start looking up at the parents, embodiments can look at siblings. Embodiments can look for a unique parent or sibling, such as the case where there is a parent that is, for example, a DIV (division in HTML) or a P (paragraph in HTML). And then inside the paragraph there are three spans. If none of them had unique identifications on them (e.g., no unique identifier), the DIV may have a unique identifier. But, if there is a change to the third span, embodiments can look to see that there are three span children and that current node is a third span child.

This can use both sibling or ancestor DOM node identifiers and DOM element attributes that are unique. This can use the order of the node among its siblings. Embodiments can also find DOM element attributes that are unique among sibling DOMs. For example, one span can have a text size of 35 and it is being modified to text size of 22, so that is how embodiments can uniquely identify it. When no sibling or ancestor node that has a unique DOM node identifier is identified, DOM element attributes that are unique among sibling DOM elements can be stored to identify a first node in the path to the associated node.

In one example with JavaScript, one might call out a specific identifier (e.g., a book) in JQuery. There might be a number of pages that are children in the book, and so a user might request the element of book and add a new child. So in other words, a user wants to add a new page. Thus, there are use cases where embodiments might address things where there is a unique identifier like book, the book tag or element, or node, and then address it from a perspective of children.

c. Processes for Compact Storage

Figure 4:
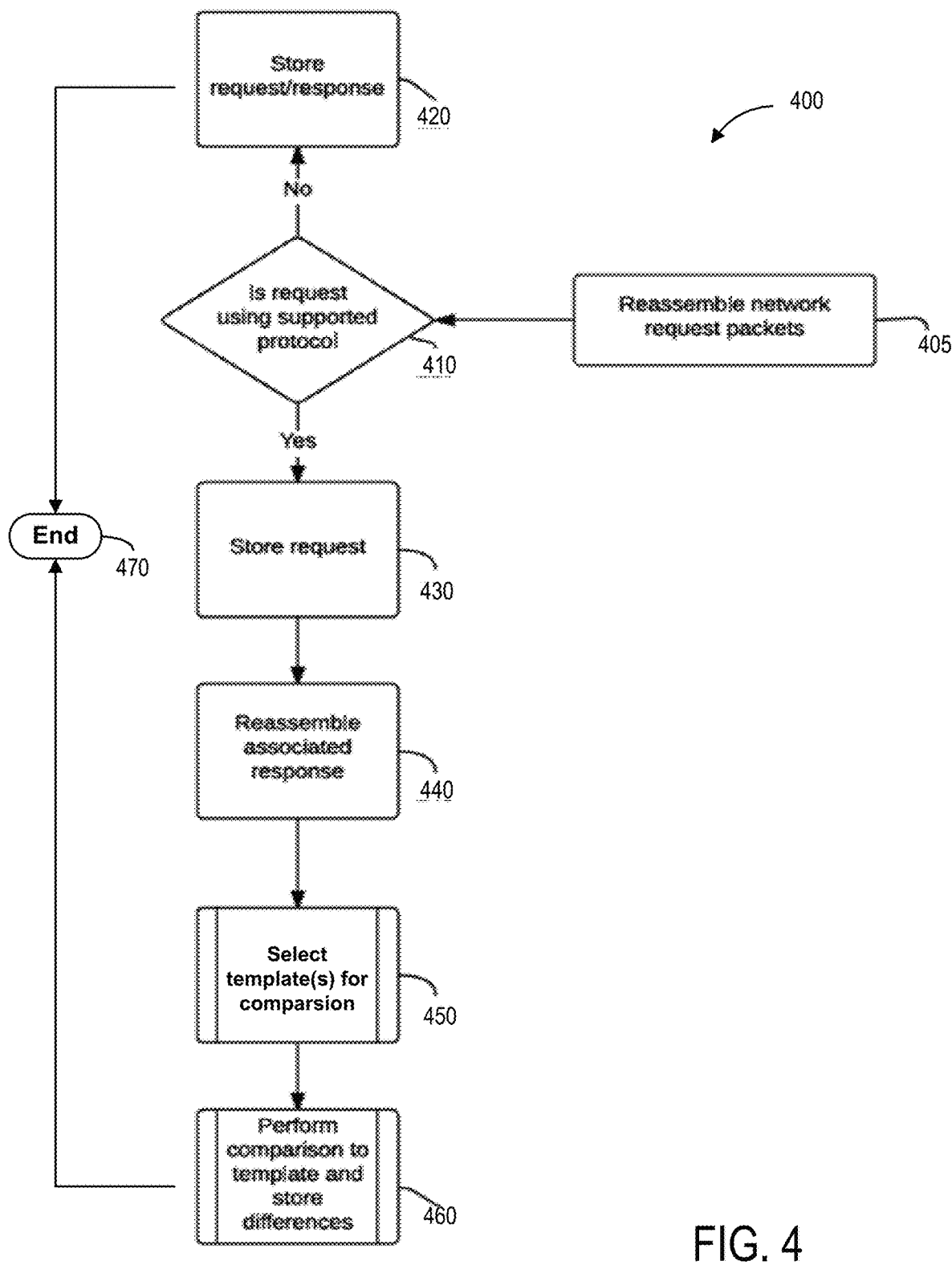
FIGS. 4-6 depicts an example of a high-level workflow of a process for compact storage of a view capture according to some embodiments.

Now turning to FIG. 4 is an example that illustrates a high-level workflow 400 of a process for compact storage of a view capture according to some embodiments. In many applications used on the Internet today, much of the network traffic communicated in a network environment (e.g., a client-server model) is in responses transmitted between client devices and capture management. To improve efficiency of compression of data, some embodiments disclosed herein may use techniques such as determining a similarity of transmitted data to previously transmitted data that has been stored, and storing the transmitted data based on assessment of the similarity. For example, all or a portion of a view is different from the previously stored view may be stored. By storing the differences in the views, greater efficiency of compression of storage of the views can be achieved.

Workflow 400 can be implemented by capture management system in FIG. 1. Workflow 400 may begin at step 405, by processing one or more data packets (e.g., request packets) captured for a network communication. The processing of request packets may include processing known in the art to identify data corresponding to responses and requests. For example, the captured network packets may be reassembled to generate request and/or response including data of a captured view that is transmitted between a client computer system (e.g., client computer system 102) and a computer system (e.g., web server 140). By performing such processing, capture management system can isolate data of captured views in communication within a client-server model. Data packets including a captured view may be reassembled based on known techniques upon determination that the data packets are transmitted using a supported communication protocol.

At step 420, a determination is made whether a communication (e.g., a request or a response corresponding to one or more data packets) is transmitted using a supported communication protocol. Examples of supported communication protocols include, without restriction, network communication protocols such as HTTP, HTTP/2, SPDY, and File Transfer Protocol (FTP). Supported communication protocols may support use of a request identifier or so other field, such that communications that are related or similar can be grouped based on the request identifier or a common field. An example of a request identifier is a universal resource identifier (URI) supported by protocols HTTP, HTTP/2, SPDY, and FTP. In some embodiments involving use of HTTP, HTTP/2, SPDY, or FTP, a URL in a request is used as the unique request identifier. Other communication protocols may be similarly supported and thus this list is to be viewed as non-exhaustive.

A determination as to whether a communication is using a supported communication protocol may be based on information in a data packet that is captured for the communication. A data packet may be examined to determine whether it includes a request identifier or some other data defined by a supported communication protocol. For example, a determination may be made that a data packet of a communication is transmitted using a supported communication protocol based on determining that the data packet has an identifiable field or a request identifier of the supported communication protocol. Upon determining that a communication is transmitted using a supported communication protocol, workflow proceeds to step 430. Upon determining that a communication is not transmitted using a supported communication protocol, workflow 400 proceeds to step 420.

At step 420, upon determining that a communication (e.g., one or more data packets) are not transmitted using a supported communication protocol, the data packets corresponding to the communication (e.g., a response or a request) are stored in their entirety for future use. Workflow 400 proceeds to 470 where it ends.

Upon determining that a communication is transmitted using a supported communication protocol, at step 430, the data packets corresponding to the communication are stored. In some embodiments, data corresponding to a request can be normalized for storage using relational database techniques known to one skilled in the art. Generally most communications can be very structured and/or repetitive. For example, HTTP requests may include common fields that are reused from one request to the next request, such that a browser name can be reused over multiple HTTP requests. As such, greater compression can be achieved by de-duplicating fields where there is common data that is often repeated across multiple requests.

At step 440, the data packets corresponding to a communication can be processed to reassemble a communication (e.g., a response or a request). In some instances, the majority of communications between a client and a server are responses, not requests. In such instances, the data packet(s) corresponding to a request may simply be stored without subsequent processing to determine the request. Whereas response data may comprise many data packets, the data packets corresponding to a response may be reassembled to determine the response. Data packets may be reassembled using techniques known by a person skilled in the art, such as disclosed herein with respect to responses.

At step 450, one or more templates (e.g., resource templates) may be selected for comparison with data (e.g., one or more data packets) corresponding to a communication (e.g., a response). The communication may be the one identified from data packets reassembled at step 440. One or more templates of data may be previously stored, where each template is stored for a distinct communication (e.g., a response or a request). A template may store data defining a resource transmitted in a distinct communication. As discussed below, computer system 130 can store a template of data obtained from data for a distinct communication (e.g., a response or a request). The templates may be selected for comparison with a communication to determine whether all or part of the communication matches a template.

In at least one embodiment, a template may be selected for the comparison based on an identifier in the data of the communication being compared. For example, a URL identified in the communication (e.g., a URL in an HTTP request) may be used to select one or more templates for the comparison. In this example each of the templates may be stored based on a common part of the URL (e.g., a URL for a website). This example is further detailed with respect to FIG. 3. In some embodiments, a template for a communication may be stored with unique information (e.g., an identifier) from the communication. As such, one or more templates may be selected using information in the communication (e.g., a type of communication) that is related or common with the unique information identifying a template. In some embodiments, one or more templates may be selected using document similarity matching techniques disclosed herein. In yet other embodiments, one or more templates may be selected for comparison using one or a combination of techniques disclosed herein, such as through use of an URL or other information in the communication.

At step 460, a determination is made whether the information in a communication (e.g., a response or a request) matches all or part of one or more templates selected at step 450. The template(s) may be identified at step 450. The determination may include performing a comparison between a template and the information in the data corresponding to a communication. The comparison may be performed by applying a comparison algorithm (e.g., Meyer's diff algorithm) or a similarity matching algorithm. The comparison may include determining a measure of similarity to the template that is compared. Based on the comparison, a template can be identified that matches all or a part of the information of the communication. In some embodiments, a template may be selected based on the degree (e.g., a measure of similarity) to which the template matches the information of a communication. For example, a template may be selected from among multiple templates based on the template having the best match (e.g., a greatest measure of similarity or least amount of differences) with the information of the communication. In another example, a template may be selected based on a measure of the similarity satisfying a threshold for comparison (e.g., a similarity threshold).

At step 460, based on the comparison, a determination is made as to the differences between the template and the information in the communication. The differences in the communication may be stored. The differences may be stored in association with the template and with information indicating the communication. In some embodiments, the differences may be stored as a new template in association with the template. As discussed below, the template and the differences may be used to recreate the communication at a later time without storing the entire contents of the communication. The process described with reference to step 460 is further detailed in U.S. Non-Provisional patent application Ser. No. 15/009,488, entitled "TECHNIQUES FOR COMPACT DATA STORAGE OF NETWORK TRAFFIC AND EFFICIENT SEARCH THEREOF" and filed on Jan. 28, 2016, which is incorporated by reference for all intents and purposes.

Workflow 400 proceeds to end at step 470.

In some embodiments, network traffic (e.g., data packets of a communication) may be stored as a template or as a compressed edit script. A template or a script for storing network traffic may be stored based upon an identifier. The identifier may be based on information that is unique to a communication that is being stored. For example, the identifier may be a resource identifier (e.g., a URL) or some other identifier of a view in an application that is obtained from the data representing the communication. A resource identifier associated with a template may be used to match the template to a communication having the resource identifier as part of a URL in the communication. A matching template can be compared to the communication for determining compact storage of data for the communication. Thus, matching the correct template can be important in achieving compression to prevent duplicate storage of network traffic that has been stored.

Figure 5:
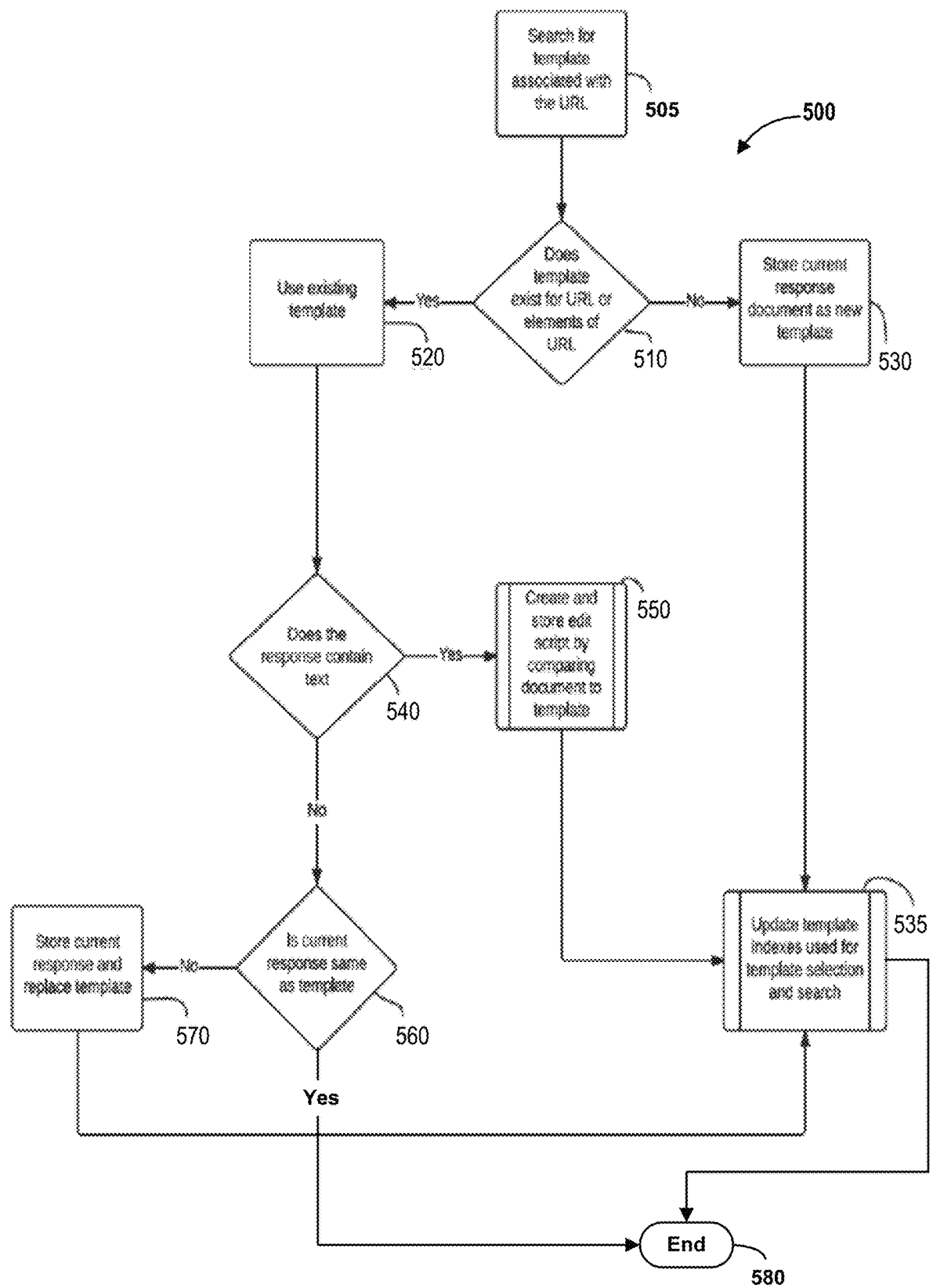

In FIG. 5, workflow 500 illustrates is an example of a process for storing network traffic. Workflow 500 begins at step 505, by searching for a template that matches information in a communication of network traffic (e.g., a request or a response). The information may be the URL or elements of the URL in the communication. In some embodiments, an identifier of a view or a page in an application may be used instead of a URL. For purposes of explanation, a URL is used as an identifier for a unique page or view in an application. As discussed above, system 130 may store a plurality of different templates for compact storage of network traffic. The search may be performed on the plurality of templates. In illustrative example, if a web client performs a request and a server supplies a response for "index.html" of a website, the system uses the full URL "index.html" to look for an existing "index.html" template. If the request is for "controller.jsp?action=view_account&location=CO", a portion "action=view_account" in the request is used to search for a matching template. The parameter value "view_account" can be most useful in the unique identification of templates created based on similar responses. Similarly, one embodiment may use other fields provided in the request, such as POST data, instead of solely the URL. Additionally, yet some embodiments may forgo elements in the URL and use document similarity matching to search for a template that closely matches information in a communication of network traffic, the process of which is described herein.

At step 510, a determination is made whether a template exists for the URL or elements of the URL. Upon determining that a template exists for the URL or elements of the URL 510, workflow 500 proceeds to step 520, where the template identified based on the search at step 505 is further used for processing in workflow 500 as described below.

Upon determining that a template does not exist for either of the URL or elements of the URL, workflow 500 proceeds to step 530, where the information in the communication may be stored. For example, the URL or elements of the URL obtained from the communication may be stored as a new template in association with the information in the communication. Proceeding from step 530, at step 535, the new template may be stored in association with a template index along with other template indexes for the existing templates. For example, the storage of template indexes for existing templates may be updated with a template index for the new template created at step 530. The template indexes may be used to search for templates. Further details about storage and indexing of templates is described below, in particular with reference U.S. Non-Provisional patent application Ser. No. 15/009,488, entitled "TECHNIQUES FOR COMPACT DATA STORAGE OF NETWORK TRAFFIC AND EFFICIENT SEARCH THEREOF" and filed on Jan. 28, 2016, which is incorporated by reference for all intents and purposes. Workflow 500 may proceed to end at step 580 after step 530.

Now returning to step 520, the template identified based on the search as matching the URL or elements of the URL may be selected. Upon selection of the template, at step 540, the communication based on which the URL or the elements of the URL are obtained from is processed to determine whether the communication includes content, such as text. Information in the communication, such as such as the HTTP headers, may be used to identifying the content type as text. Other indicators such as introspection into the body of the communication may be utilized to assess the content in the communication. One example is checking the content-type field in an HTTP header for indications that the communication includes text. Examples of a content-type field in a communication includes text/html, text/plain, text/rtf, text/css, text/Javascript, text/xml, application/JSON, application/Javascript, application/xml, etc. In another example, the communication may be scanned to determine if the communication includes invalid character values, which may indicate a binary response. In some embodiments, the communication may be processed to parse one or more data items (e.g., tokens of data) in the content. The communication may be parsed using one or more delimiters, such as characters. Delimiters may be chosen based on a format of the communication. It may be determined that the communication does not include text based on determining that the communication includes binary data.

Text resources on websites such as HTML, JavaScript and CSS are likely to be communicated with a limited amount of changes to the document. In contrast, binary documents, such as images and fonts, are more likely to be changed in more numerous, larger areas, since even small visual changes can lead to widespread changes in the binary file representation due to the nature of these formats. Compression by storing only the changes is less likely to be effective when changes are numerous and larger. Binary documents are often unchanged for long periods of time, and thus a simple comparison to detect changes may be more efficient. Text content may be compressable by storing differences when compared to a template, while the entire binary content may be best stored when any changes are detected. In some embodiments, some text documents in communications may not be stored, rather focusing only on communications including documents of interest, such as Hypertext Markup Language (HTML) response documents. In some embodiments, all binary data in communications may not be and only communications may be analyzed for text response documents.

Upon determining that a communication includes content, such as text, an edit script may be created by comparing the communication to the template selected at step 520. The edit script mat be stored. This process is further detailed in U.S. Non-Provisional patent application Ser. No. 15/009,488, entitled "TECHNIQUES FOR COMPACT DATA STORAGE OF NETWORK TRAFFIC AND EFFICIENT SEARCH THEREOF" and filed on Jan. 28, 2016, which is incorporated by reference for all intents and purposes. From step 550, workflow may proceed to step 535 to update the templates indexes as described above.

Upon determining that a communication does not include content, such as text, the communication may be compared with the template selected at step 520 to determine whether content in the communication is similar or identical to the template. In some embodiments, the communication may be compared to the template by such means as comparing a hash of the communication to a hash of the template.

Upon determining that content in the communication is not similar or identical to the template at step 560, workflow proceeds to the step 570. At step 570, the communication may be stored as a new template. The template may be replaced each time a binary change is detected with content stored in the template. Workflow 500 may proceed to step 535 to update the template indexes based on the new template stored for the content in a communication.

Upon determining that content in the communication is similar or identical to the template, workflow 500 may proceed to end at step 580. Thus, when a communication is similar or identical to a template, the communication may not be stored, thereby reducing the total storage of communications. Such compact storage of communications may improve storage compression by upwards of 99%, as only metadata about the transmission (e.g., a timestamp, IP address, and other header values) may be stored (although in some embodiments even this metadata is not stored).

Figure 6:
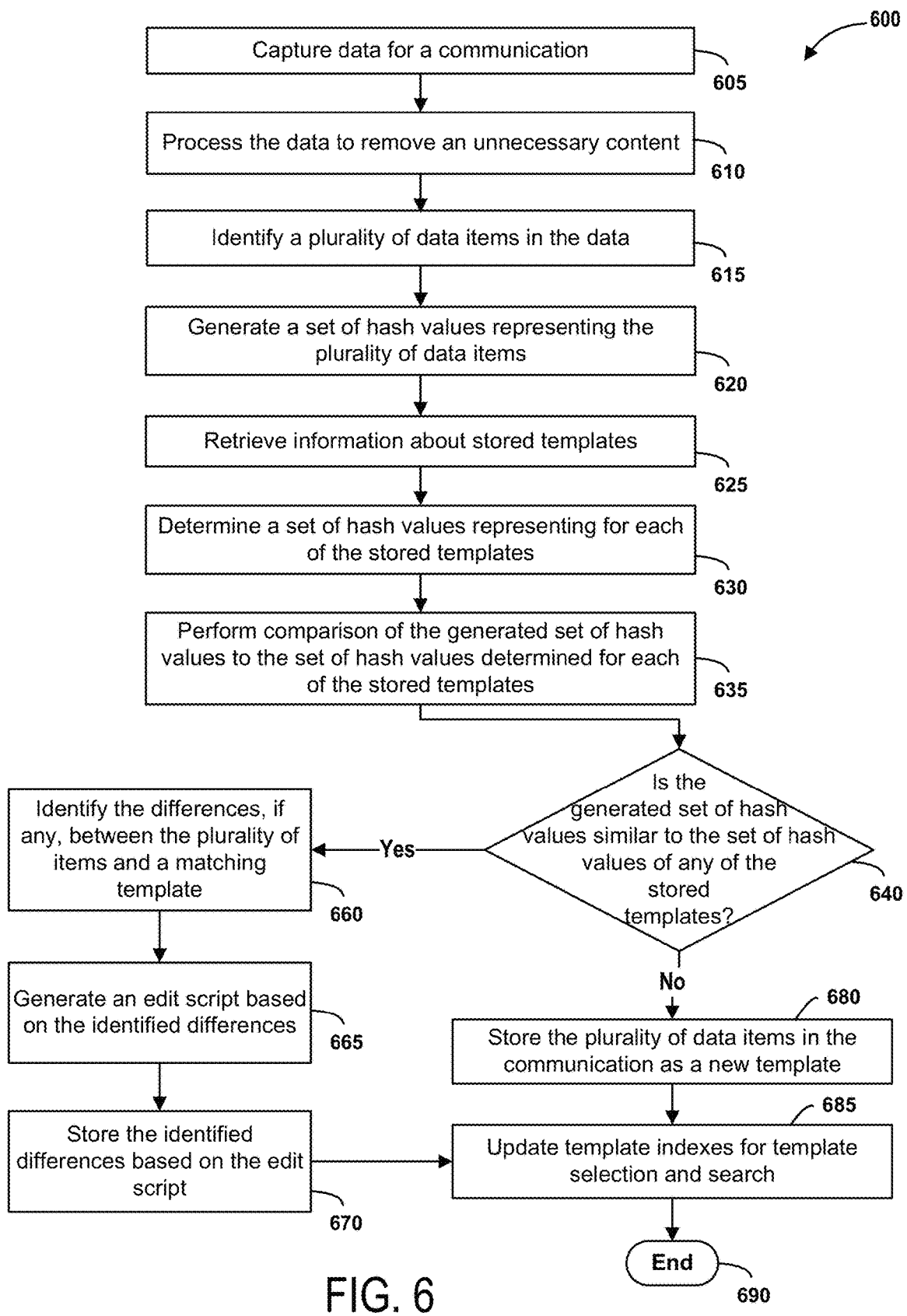

Now turning to FIG. 6 is an example of a workflow 600 of another process for storing network traffic. Starting at step 605, network traffic may be captured for communications. In particular, data may be captured for a communication comprising one or more data packets. Data may be captured using techniques disclosed here, such as those described with reference to FIG. 1. In some embodiments, data in a communication may be identified in the one or more data packets which comprise the communication. The data in a communication may include a resource (e.g., a web page or a page in an applications). As such, the data may include content, which may define the resource. The data for a communication may include metadata, or other information in addition to a resource.

At step 610, the data representing a communication may be processed to remove unnecessary content. Unnecessary content may include content that does not define a resource in the communication. For example, unnecessary content may include metadata or formatting data of a resource in the communication. The unnecessary content may be identified and extracted using techniques known by a person skilled in the art. For example, content to be removed may be identified and extracted by parsing data representing a communication. Unnecessary content such as metadata may be identified based on a known format of a communication protocol. Unnecessary content such as format data may be identified based on a format of the resource that is requested. Removing unnecessary content may assist in the identification of a resource included in a communication. As such, the comparison of the content of a resource can be easily compared with existing templates as disclosed herein when unnecessary content is removed.

At step 615, a plurality of data items are identified in the captured data. Each of the plurality of data items may form a portion of content in the communication. The content may be a resource, such as a web page. In some instances, one or more of the data items may include formatting of the content. In some embodiments, a plurality of data items may be a plurality of tokens identified by parsing content in a communication. A plurality of data may be identified by implementing techniques disclosed herein. For example, a plurality of data items may be identified by parsing the content using one or more delimiters by implementing techniques described in U.S. Non-Provisional patent application Ser. No. 15/009,488, entitled "TECHNIQUES FOR COMPACT DATA STORAGE OF NETWORK TRAFFIC AND EFFICIENT SEARCH THEREOF" and filed on Jan. 28, 2016, which is incorporated by reference for all intents and purposes.

In at least one embodiment, content in a communication may be parsed to identify a plurality of data items (e.g., a plurality of tokens), each data item corresponding to a token of data. For example, when content is a text document, the plurality of data items may be identified by parsing the content using one or more delimiters. Where content is an HTML document, delimiters such as a space (' '), '<', and '>' may be used to parse the content to identify the plurality of data items. Delimiters may be chosen to optimize computing performance. The choice of delimiters may impact processing performance during processing for comparison of content to templates. The choice of delimiters may be based on the type of content and/or format of content (e.g., HTML or Javascript).

At step 620, a set of hash values may be generated to represent the plurality of data items. The set of hash values may be generated using a hashing algorithm. In some embodiments, the hashing algorithm is a minimum hashing ("MinHash") algorithm, which can be used to determine the similarity of two data sets. Techniques for comparing data sets are disclosed herein for determining the similarity of the plurality of data items in a communication compared to one or more stored templates. As part of determining the similarity of two data sets, a set of hash values may be generated for the plurality of data items to be compared later to one or more templates.

In at least one embodiment, a min hash algorithm may be implemented to generate the set of hash values for the plurality of data items. The set of hash values may correspond to the set of minimum hash values generated for the plurality of data items for implementing the min hash algorithm. Initially, a shingle length value may be determined, where the shingle length value is a value that defines a group of data items of the plurality of items, the group being the number of consecutive data items of the plurality of data items that will be processed using the algorithm. Determination of shingle length value may be based on processing performance considerations, such as the size of content defined by the number of data items. One or more hashing algorithms may be performed against each of the data items in a group of data items defined by the shingle length value. The number of hashing algorithms applied to a group of data items may be based on processing performance considerations, such as processing performance for comparison of content with a template. The hashing algorithms may be applied to each of the data items in all of the groups of data items identified based on the shingle length value.

Upon determining a shingle length, one or more groups of data items are identified in the plurality of data items based on the shingle length. Each group of data items is identified based on the shingle length value as one or more different consecutive data items in the plurality of data items. For example, a group of data items may be five consecutive data items when the shingle length value is five. For each group of data items, one or more hashing algorithms are performed for each data items in the group of data items defined by a shingle length value. In at least one embodiment, for the number of hashing algorithms applied to each group of data items, each of the hashing algorithms may be applied to each data item in the group. The result of the application of the hashing algorithms to a data item are used as a seed to the next data item. The result of applying the hashing algorithms to the next data item is used as a seed for the next data item and so on in the group of data items until the group of data items are processed for the hashing algorithms. As an example, the shingle length is five and the number of hashing algorithms is 100. For a group of five data items (e.g., five tokens), a 100 hashing algorithms will be applied to each token, taking the resulting value of each and applying it to the next token in the group. So in other words, 500 hashing algorithms will be applied across the five tokens in the group.

In some embodiments, for each one of the different hashing algorithms applied to each data item in the group of data items, an algorithm (e.g., a themed algorithm) may then be applied such that a minimum hash value of each of the data items, based on application of the hashing algorithms to the group, will be generated across all of the data items in the group. The themed algorithm may be applied to each of the next groups of data items. A set of hash values may be determined for each of the plurality of data items. The set of hash values may be the minimum hash values generated for each of the data items of the groups of data items.

In some embodiments, the generated set of hash values may be transmitted from one computer (e.g., client computer system 102) to another computer (e.g., computer system 130). The set of hash values may be generated at client computer system based on data obtained by client computer system 102. As such, to minimize sending all of the data of a communication to computer system 130, client computer system 102 may send the generated set of hash values, which can be used for comparison with templates stored by computer system 130 as further detailed below. By sending the set of hash values instead of the content in a communication, the amount of bandwidth consumed is minimized for retransmission of content for template generation. In other words, client computer system 102 can minimize use of network bandwidth by sending the generated hash values instead of the actual content, which may consume more bandwidth.

At step 625, information about stored templates, if any are stored, may be retrieved. The information may identify a location of the templates. As discussed above, a template may include content extracted from a communication. The content may be one or more data items (e.g., tokens) that are parsed from the communication. A data store with the templates may be accessed to obtain the data identifying the templates.

In some embodiments, templates may be identified based on information in the communication. For example, templates may be identified based on a URL or an element of a URL in the communication as described with reference to step 505 of FIG. 5. Using information in the communication to identify templates may improve processing performance by reducing the number of templates to compare with the data in the communication.

At step 630, a set of hash values may be determined for each of the templates. A set of hash values for the template may be generated using a hashing algorithm as applied at step 620. In some embodiments, the set of hash values generated for a template may be stored in association with the template. The set of hash values for the template may be generated when the template is created. In some embodiments, the set of hash values for the template may be generated at the first instance the template is used for a comparison with content in a communication, by applying the same hashing algorithm to the one or more data items in the template. As will be explained below, the set of hash values for each template can be compared to the set of hash values generated for the content in the communication.

At step 635, a comparison is performed between the set of hash values generated at step 615 and the set of hash values for each of the templates. Any number of comparison techniques may be applied as known by a person skilled in the art. A result may be generated based on the comparison. A result value may be generated that indicates a measure of the difference or the similarity between the content in the communication and the template. A result may indicate the value(s) that are different between the sets of hash values that are compared.

At step 640, a determination is made whether the generated set of hash values is similar to any of the set of hash values determined for the templates. A determination that the sets of hash values may be similar may be based on whether the sets of hash values match exactly. A similarity metric analysis may be performed to determine a similarity metric. The similarity metric may be computed using one or more of a Jaccard Index or other method of similarity analysis known to a person skilled in the art. One or more comparison criteria may be defined for comparison of the sets of hash values. The criteria may be selected to achieve a desired balance of compression with respect to storage. The similarity analysis can be assessed based on the criteria to determine whether the sets of hash values are similar. For example, the comparison criteria may include a similarity threshold (e.g., a value defining a percentage of similarity). The result (e.g., similarity metric) of the similarity analysis may be assessed in view of the similarity threshold, such that the sets of hash values may be deemed similar when the similarity threshold is satisfied.

More criteria or criteria (e.g., a higher similarity threshold) that are harder to satisfy may achieve better compression per communication, but may result in additional storage as new templates are likely to be created. Less strict criteria (e.g., a lower similarity threshold) may result in use of less template storage but less effective compression per communication. In some instances, data in a communication may be closely similar to a template, such that a similarity threshold may be defined so data that matches with a certain degree of similarity to templates are not promoted to templates, as to prevent storage of closely similar templates.

Upon determining that the generated set of hash values does not match the set of hash values of any of the templates, workflow 600 proceeds to step 680. Upon determining that the generated set of hash values does match the set of hash values of any of the templates, workflow 600 proceeds to step 660.

At step 680, the plurality of data items in the communication may be stored as a new template upon determining that the plurality of data items does not match a template. A new template may be created and stored as described with reference to step 530 of FIG. 5. The generated set of hash values may be stored in association with the template. As explained above, the set of hash values may be used later for comparison with a set of hash values generated for content in a new communication.

At step 685, the new template may be stored in association with a template index along with other template indexes for the existing templates. For example, the storage of template indexes for existing templates may be updated with a template index for the new template created at step 680. The template indexes may be used to search for templates. Further details about storage and indexing of templates is described below, in particular with reference to in U.S. Non-Provisional patent application Ser. No. 15/009,488, entitled "TECHNIQUES FOR COMPACT DATA STORAGE OF NETWORK TRAFFIC AND EFFICIENT SEARCH THEREOF" and filed on Jan. 28, 2016, which is incorporated by reference for all intents and purposes. Workflow 600 may proceed to end at 690 after step 685.

In some embodiments, a measure of similarity or difference may be determined between the sets of hash values that are compared at step 635. Although the set of hash values does not match the set of hash values of any of the templates, the plurality of data items in the communication may have some similarities with a template.

Now returning to step 660, upon determining that the generated set of hash values does match the set of hash values of any of the templates, the plurality of data items is compared to the template for which the set of hash values has a similarity. The differences, if any, may be determined between the plurality of data items and the content in the template. The differences may be determined using techniques such as those disclosed with reference to FIGS. 4 and 5. In some embodiments, a diff algorithm (e.g., Meyers diff algorithm) may be applied to identify the differences between the plurality of data items and the template.

At step 665, an edit script may be generated based on the differences identified at step 660. The edit script mat be generated using techniques disclosed herein with reference to FIGS. 4 and 5.

At step 670, the edit script may be stored for the identified differences. The template may be updated with the differences in the edit script. In some embodiments, the edit script may be stored in association with the template which was identified as being similar at step 640. Storing the edit script in association with the template enables future similarity analysis to consider the edit script in the event that data in a communication matches content in the template and the edit script.

From step 670, workflow 600 proceeds to step 680 where the template indexes are updated for the template. In some embodiments, the template indexes may be updated to include a reference to the edit script associated with the template.

Workflow 600 ends at step 690.

d. Fingerprint Selection for View Capture

According to various embodiments, a capture system (e.g., capture management system 130 and capture management platform 152) disclosed herein can identify content (e.g., text) most likely to appear in a document for a view in an application. A document may be generated based on a layout of a view.

A capture system may perform processing on a document to determine content (e.g., text) most likely to appear in the document, such as a layout of a view. The content most likely to appear in a document may be the content for which the capture system generates hashed data (e.g., a fingerprint), using techniques disclosed herein. The fingerprint(s) may be used to identify a document accessed by a client and whether such a document of a view has changed. For example, fingerprints may be compared to content in a document to determine content in the document that has changed or is different. The fingerprints used for comparison of a document may be identified upon identifying the document as a matching document for which fingerprints are generated.

Content may be identified as most likely to appear in a document based on satisfying one or more criteria (e.g., a threshold frequency) for appearing in the document. In some embodiments, the capture system may identify content most likely to appear in a document based on information about a document. The capture system may be requested to provide fingerprints for a document. The information about the document may be used to identify content likely to appear in the document. The content likely to appear in the document may be processed by the capture system to generate a fingerprint(s) for the content. In some embodiments, content most likely to appear for a document may be classified for a set of documents, such as documents defining a website. The content most likely to appear may be identified for the entire website instead of a specific document. In some embodiments, the capture system may store content most likely to appear for a specific document and for a set of documents (e.g., documents defining a website) including the specific document. Some of the content may be similar across the set of documents.

The capture system may store content most likely to appear in a document in association with information about the document. The information about the document may include a URI, a document's originating site address, a client IP address, client language, and other indicators about the document or content for an applications. Based on a request for fingerprints for a document, content may be identified according to information about the document in the request. For example, a request sent by the client may include various indicators such as to URI, document's originating site address, client IP address, client language, and other indicators, any of which may be used to identify the document having a layout of a view.

In some embodiments, content most likely to appear in a document may be stored in association with a signature of the document. In doing so, the capture system may achieve greater storage efficiency by avoiding storage of a document, and instead storing the signature of the document. A signature of a document may include one or more values generated based on data in the document. The value(s) may be generated using one or more hash (also referred to herein as "hashing") functions. A hash function may be implemented using a hashing (also referred to herein as a "hash") algorithm. The signature of a document may be used to identify the content most likely to appear for a document identified based on a signature included in a request from a client. The signature of the document may be generated using techniques disclosed herein. The capture system may store documents for an entire website by storing a signature for each different document accessible for the web site.

Based on identifying a document matching a document identified in a request from a client, the capture system may send one or more fingerprints for the document. The capture system may send, to a client, a specific set of fingerprints for each unique document while also sending a separate set of fingerprints for an entire website. The fingerprints may be generated for the content most likely to appear for the document, and/or a set of documents, whichever way defined. In doing so, the client can cache the site-wide fingerprints to achieve greater efficiency. The capture system may send fingerprints for a document to a client at any time. By sending fingerprints for content most likely to appear, a client can locally cache the fingerprints in advance of a request for a document. In doing so, a client can reduce processing time for determining whether a document matches based on fingerprints being stored locally. To achieve efficient communication between a client and the capture system, a limited, or selected amount of fingerprints can be sent from the capture system.

Figure 7:
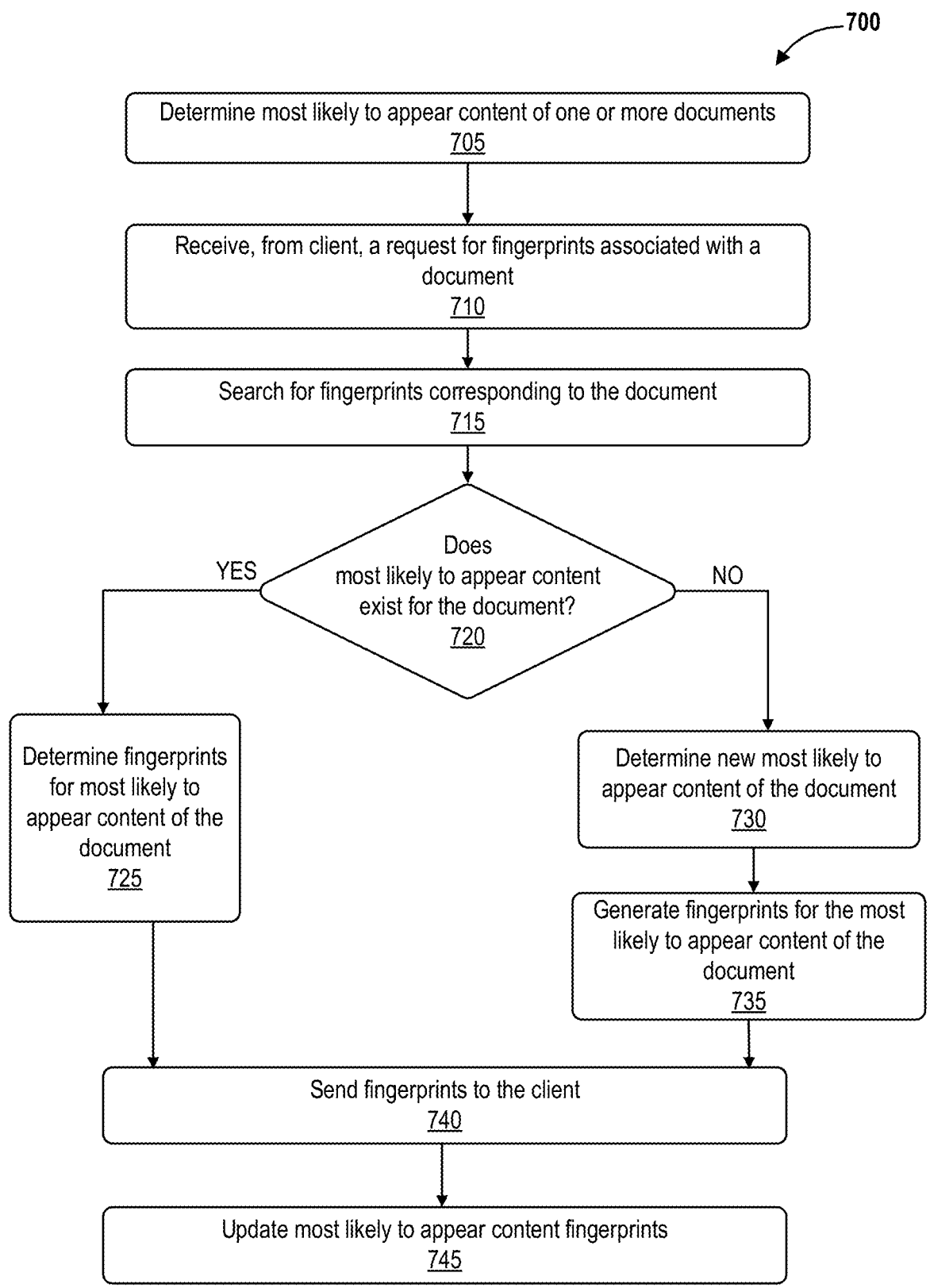
FIGS. 7-9 illustrate a fingerprint selection process according to some embodiments.

In some embodiments, the capture system may perform processing to determine content most likely to appear in one or more document through statistical analysis. The capture system may determine content most likely to appear for one or more documents based on appearance frequency which is known to one skilled in the art. The appearance frequency may be determined based on analysis of content in the document(s). The capture system may determine content most likely to appear based on one or more criteria (e.g., frequency) having a threshold for appearing in the document(s). The capture system may determine that a specific block of content is 90% most likely to be displayed for a specific document. In this case, the capture system can generate and store fingerprints for the 90% most likely to appear content. Another example would be that, through the same statistical analysis, the capture system may determine there are a top number of content blocks that are likely to appear a threshold frequency of time. In yet another example, the capture system may determine that based on two previous documents viewed at a client, a third document is likely to contain a specific block of content based on previous captures analyzed where clients had viewed the same two previous documents. In this case, the capture system may choose to send this expected block of a fingerprint based on the patterns identified by the client's history. FIG. 7 illustrates workflow 700 of a process for the identification of the most likely to appear content according to some embodiments.

The capture system may implement a fingerprint selection process described below with respect to FIG. 7 for choosing the most likely to appear content for a document. A document may be identified based on information sent from a client. The information may include a signature of the document, or other information identifying the document such as a uniform resource indicator (URI), language, other common header information such as OS/browser/location, or through keeping track of the users session and previous URI's the client has visited. A signature of a document may be generated using techniques described with reference to FIG. 9. The capture system may compare the information identifying a document, such as a signature of the document, to find a document matching the information. For example, capture system may compare a signature of a document received from a client to signatures of different documents stored by computer system 130. A document may be identified as matching based on a signature matching according to a threshold value. As disclosed below, a signature may be comprised of multiple data portions, each of which is hashed based on a data portion in the document.

The capture system may identify fingerprints for a document identified as matching a document identified by a request from a client. The fingerprints may be used by client to identify differences between a document associated with the fingerprints stored by the capture system and a document at the client matching the document stored by the capture system. The differences may be sent from the client to the capture system. The differences may be stored in association with the document at the capture system. The capture system can reassemble the document based on its signature and add the differences to recreate the document accessed at the client. Such a technique can be used to determine a document viewed by a user at the client without having to store the entire document at the capture system and without the client having to communicate the entire document to the capture system.

FIG. 7 illustrates a workflow 700 for managing fingerprints for a document according to some embodiments. In some embodiments, workflow 700 may be implemented by computer system 130 of FIG. 1. Workflow 700 may be implemented to provide a client with fingerprints of the most likely to appear content for a document accessed at the client. The client may use the fingerprints to determine whether any portion of the document is different from a version of the document previously stored by a capture system. Some embodiments make use of the general condition of the web server applications serving very similar responses based on a specific URL. Identifying the correct most likely to appear content is important in achieving compression.

Workflow 700 may begin at step 705, most likely to appear content is determined for one or more documents. The document(s) may be part of a website. The most likely to appear content may be determined according to techniques disclosed herein such as those described above. In some embodiments, the most likely to appear content may be determined for a website, including documents individually. The identified content may be stored in association with the documents themselves. The content identified in a document may include one or more data portions. Each of the data portions may be identified as content most likely to appear in the document. Content most likely to appear in the document may be identified as satisfying one or more criteria (e.g., a threshold frequency) for appearing in the document.

The documents may be stored by the capture system in association with information identifying those documents. To conserve storage, the documents may be accessible at a different computer system (e.g., a web server that hosts the documents) and instead the capture system may store information identifying those documents. The information identifying the document may include a URI identifying a location of the document, other information about the document, a signature of the document, or a combination thereof. Workflow 700 may include determining identification data for a document. The document may be processed to determine the identification data. For example, a signature of the document may be determined using techniques such as those described with reference to FIG. 9.

At step 710, a request may be received for fingerprint(s) associated with a document. The request may be received from a client. The request may include information identifying a document. The information identifying a document may be determined by the client in a manner similarly described above at step 705. The information may include a URI of the document and a signature of the document. Instead of sending the entire document to the capture system, a client may request the fingerprints, so that it can determine whether content of the document has changed. Such techniques minimize communication resources, e.g., communication bandwidth, by limiting an amount of data communicated between the device and the capture system. The techniques further reduce the processing performed and the power consumed by the client to communicate data, since fingerprints, not an entire document, are communicated.

At step 715, a search is conducted for fingerprints corresponding to the document, if any. In one embodiment, the capture system looks for a matching selection of fingerprints based on information identifying the document (e.g., the URL or elements of the URL). For example, if a client performs a request and a server supplies a response for "index.html" of a website, the capture system uses the full URL "index.html" to look for an existing "index.html" document incorporating the most likely to appear content. If the request is for "controller.jsp?action=view_account&location=CO", the server may use the portion "action=view_account" for the lookup for most likely to appear content, as the parameter value "view_account" will be most useful in the unique identification of similar responses. Similarly, one embodiment may use other fields provided in the request, such as site's host name, POST data, or client language, instead of solely the URL. In some embodiments, the capture system may search information associated with documents to find a document that matches the document identified by the request at step 710. For example, the capture system may search documents to identify one that has a signature matching the signature of the document identified in the request.

At step 720, a decision is made whether any content exists for the document. The document may be compared to documents ("known documents") previously recognized, or known, by the capture system. The known documents may be identified has having content that is most likely to appear for those documents. Therefore, content exists for a document if the document matches a known document for which content has been identified as most likely to appear. As such, known documents may be searched to determine whether any match the document for which a request is received at step 710. Fingerprints may have been generated for a document if the document is identified as having content likely to appear for the document. A fingerprint may be generated for each distinct data portion of the document identified as content.

To determine whether content exists, the document identified by the request at step 710 is compared to known documents to determine whether if any of the known documents are similar to the document identified by the request. Documents may be compared using techniques described with reference to FIG. 9. A document may match a known document if a threshold for similarity is satisfied based on the comparison of the documents. The information identifying the documents may be compared to determine whether a known document matches the document. For example, a signature of the document may be compared to a signature of each of the known documents to determine which, if any, of the know documents matches the document.

Upon identifying one or more known documents that match, workflow 700 may include determining whether the matching known documents are associated with any content that is likely to appear on those documents. Upon determining that content exists which is identified as being most likely to appear for a document, workflow 700 proceeds to step 725. Upon determining that content does not exist which is most likely to appear for the document, workflow 700 may proceed to step 730. The capture system may send a response to the request for fingerprints, indicating that no document matching the document in the request was found.

At step 725, fingerprint(s) are determined for the content most likely to appear in a document. The fingerprints may be generated using techniques disclosed herein, such as those described with reference to FIG. 8. The fingerprints may have been previously generated or may be generated upon determining that a document matches the known document matched as having content most likely to appear in the known document. If fingerprints were previously generated for a known document, then those fingerprints may be stored in association with the known document. The fingerprints can be retrieved based on information identifying the known document that matches the document requested at step 710.

At step 740, the fingerprints determined for the content of the known document are sent to the client from which the request is received at step 710.

Returning to step 730, which may be performed based on the decision at step 720, new content most likely to appear in the document is determined. The document is the one for which a request is received at step 710. The information identifying the document may be processed to determine whether any content in the document is most likely to appear. The most likely to appear content may be identified using techniques disclosed herein. The document may be stored by the capture system as a new known document. The document may be stored in association with the content identified as most likely to appear for the document.

At step 735, one or more fingerprints are generated for the document. Fingerprints may be generated using techniques disclosed herein. Workflow 700 may proceed to step 740, where the generated fingerprints may be sent to the client from which a request was received at step 710.

At step 740, fingerprints may be sent one in one or more responses to the client. The fingerprints may be sent with information identifying the document for which the fingerprints were generated. The client can use the fingerprints to determine whether any new content has been added to the document or whether the content has changed.

Figure 8:
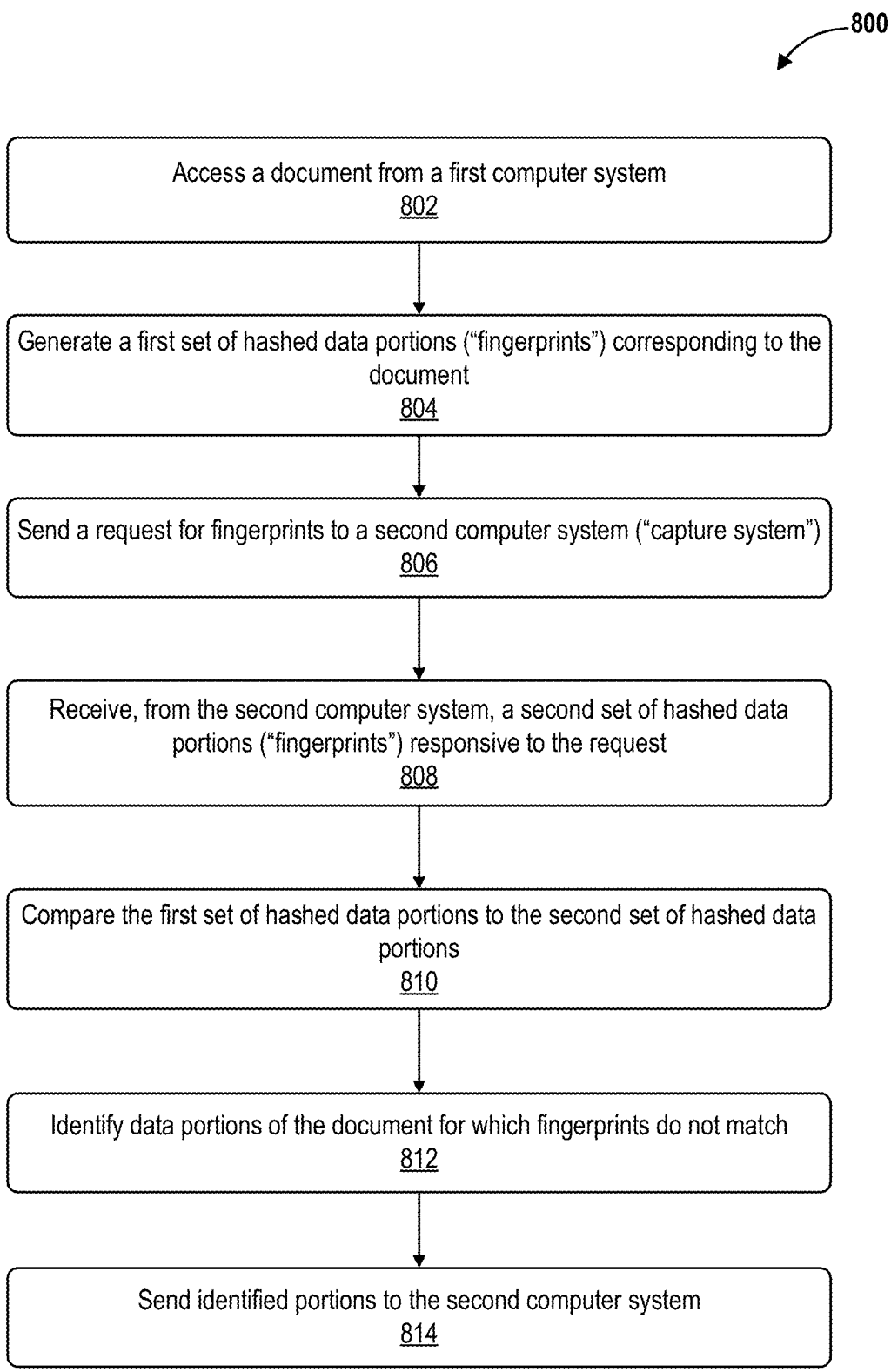

In response to receiving the fingerprints, the client may perform operations, such as those described with reference to FIG. 8. The client may generate its own fingerprints for the document which was identified in the request at step 710. The generated fingerprints may be compared to the fingerprints received at step 740. The fingerprints that do not match may be identified. The client may identify data portions of the document (as displayed in the client's browser) that are different from the most likely to appear content for which fingerprints were received from the capture system. The data portions of the document corresponding to the fingerprints that do not match may be identified as the content which is new or modified from the known document. As such, the client may send, to the capture system, the data portions of the document for which the fingerprints do not match.

At step 745, fingerprints sent from the client are received. The data portions corresponding to the fingerprints that do not match are stored in association with the known document for which fingerprints were stored. The data portions may be stored as updates to the known document. The data portions may be processed to determine whether any of those data portions should be identified as being likely to appear for the known document. The fingerprints for those data portions may be stored with the data portions as updates. In some embodiments, the capture system may generate a new set of fingerprints for the known document including the updated data portions. Workflow 700 may end at step 745.

In some embodiments, for optimal compression, the fingerprints sent to the client can be regenerated or updated as the statistical frequency of data portions appearing in the documents sent back from the clients change. By keeping the fingerprints the most up to date, and the most matching, the amount of data sent between the client and the capture system may be reduced. To keep the fingerprints up to date, the client may request the fingerprints directly from the capture system or the client may interact with a data distribution network (DDN), and the capture server may periodically update the file that is hosted on a content distribution network (CDN). In some embodiments, there can be more than one file with fingerprints, for example one specific to the requested URL and another set of fingerprints that likely appear across an entire site of related documents.

I. Fingerprint Generation of the Most Likely to Appear Content in a Document

The capture system may generate fingerprints for the content most likely to appear in a document. The techniques for generating fingerprints may be implemented at clients and the capture system. Content most likely to appear in a document may be identified as data portions. A fingerprint may be data generated based on the data portion of content. For example, a fingerprint may be generated by performing a hash function on a data portion of content. The fingerprints may identify portions of a document (e.g. a web page). As used herein, generating hashes for the most likely to appear content and/or a document may require an even distribution of hashes across the document. As used herein, generating fingerprints for the most likely to appear content may not require an even distribution of the fingerprints across the document. Accordingly, generating hashes for the document may satisfy the requirements for generating fingerprints for the document.

According to various embodiments, a document may be divided into data portions, each corresponding to different content most likely to appear. Each of the data portions may be processed to generate a hashed data portion. In some embodiments, the data portions may be of equal size. Yet in other embodiments, the data portions may be of different sizes. Data portions may be identified in a document by parsing the document based on the size of the document. A document may be parsed to divide the most likely to appear content based on content (or context) instead of size. For example, the most likely to appear content may be divided after 10 sentences instead of a set number of bytes. Yet in another example, the most likely to appear content may be divided into data portions based on tags in the HTML. Dividing a document contextually may allow to better capture the changes in the most likely to appear content as people tend to change a format (e.g., HTML) within the confines of a sentence, a block or a tag.

Based on the data portions identified in a document, fingerprints may be generated according to various techniques. In some embodiments, both strong fingerprints and weak fingerprints may be generated for each of the data portions. The data portions may correspond to the most likely to appear content in the document. Fingerprints may be generated for each different data portion. A fingerprint may be generated for a data portion by performing a hash function on the data portion. The hash function may be a weak hash function to generate a weak fingerprint. A weak hash function may be implemented using one or more weak hashing algorithms. The hash function may be a strong hash function to generate a strong fingerprint. A strong hash function may be implemented using one or more strong hashing algorithms. As disclosed herein, a weak hash function may be prone to a higher frequency of collisions in comparison to a strong hash function. However, a weak hash function may be performed faster that a strong hash function. A weak hash function may consume less computing resources than a strong hash function. As such, a weak hash function may be desirable to implement on a computing device having limited resources, such as a mobile device. After implementing techniques disclosed herein using a weak hash function, a strong hash function may be implemented for those fingerprints that match using a weak hash function. A weak hash function may be implemented using a threshold number of bits that is less than a threshold number of bits to implement a strong hash function. In some embodiments, a weak hash function may be implemented using a weak hashing algorithm defined by a 32 bits. For example, a weak hash function may be implemented such that it generates data having a length of 32 bits. In some embodiments, a strong hash function may be implemented using a strong hashing algorithm defined by 128 bits. For example, a strong hash function may be implemented such that it generates data having a length of 128 bits. The algorithms disclosed herein may be implemented by a person of ordinary skill in the art.

A hash function may be associated with one or more attributes, such as collision attribute. A collision attribute may include collision resistance. For example, collision resistance is an attribute that indicates a threshold measure of collisions that occur, or are permitted, for the hash function, such that the threshold is not satisfied (e.g., exceeded). A weak hash function may be defined by a threshold measure of collisions that is different (e.g., greater) than a threshold measure of collisions defined by a strong hash function.

According to various embodiments, the weak fingerprints may be faster to generate (e.g. using less resources) than the strong fingerprints. The fingerprints may include weak fingerprints and strong fingerprints. Weak fingerprints may be quickly calculated using a rolling, or cumulative, system, thereby minimizing computing resources to determine fingerprints. However, using a weak hash function to generate weak fingerprinting may be prone to collisions (e.g. it is non-uniquely identifying). A weak hash function may be prone to a higher frequency of collisions than a strong hash function. The rolling system may entail transforming a known fingerprint of a sequence (e.g. ABCDE), to the fingerprint of an adjacent byte sequence (e.g. BCDEF) with a sequence of computational operations. Strong fingerprints may be highly resistant to collisions such that there would be no two same fingerprints representing different portions of data across all most likely to appear content. However, strong fingerprints may use more computing resources.

A client can also generate its own set of fingerprints for a document. The capture system and the client may use the same algorithm to generate the fingerprints. Accordingly, if the capture system and the client were given the same data, they would generate exactly the same fingerprint, both weak and strong.

A document may be divided into data portions that are identified as rolling data portions. A weak fingerprint may be generated for data portions in a document using a weak hash function. The weak fingerprint may be generated using a sliding window technique using a weak hash function known by one skilled in the art. Using the sliding window technique, data portions of a document may be identified to be hashed to generate hashed data portions representing a weak fingerprint. Rolling data portions may be identified as having overlapping data (e.g., an overlapping character) between adjacent data portions. For example, if the document consists of ABCDEF, then the data portions may consist of ABC, BCD, CDE, and DEF. Some embodiments may dynamically change the algorithm or parameters for the algorithm (e.g. size of the data portions) for dividing the document into data portions based on parameters received from the capture system. A weak fingerprint may be calculated for each of the data portions in the same way as the capture system. In another example, for a document comprising content of ABCDEF, a fingerprint for ABC may be transformed to a fingerprint for BCD based on the value of D. Repeating this process, the client may go through the document and generate a fingerprint for each data portion of the document for a sliding window of data. The sliding window of data may correspond to a particular factor (e.g., number of characters) by which to slide the window for generating fingerprints.

According to various embodiments, a client may identify portions of the document that has changed from what has been sent by the server. FIG. 8 illustrates a workflow 800 of a process by which a client can determine the changed data portions of the document according to some embodiments. The process may use fingerprints received from a capture system (e.g., computer system 130) and fingerprints generated by the client.

Workflow 800 may begin at step 802, a document (e.g., a first document) is accessed from a computer system (e.g., a first computer system). The computer system may be a web server computer that stores documents. The documents may be stored in association with a web site. Each of the documents may be identified by information, such as a URI indicating a location of the document. For example, accessing a document may include sending, to the computer system, a hypertext transfer protocol (HTTP) request for the document, where the HTTP request includes the URI, and receiving an HTTP response, where the HTTP response includes the first electronic document identified by the URI. The HTTP response may include one of a hypertext markup language (HTML) document or a document including JavaScript. A document received in a response may be referred to herein as a "response document."

At step 804, fingerprints may be generated for the document accessed at step 802. A client may parse the document to identify data portions. The data portions may be identified using techniques disclosed herein. The data portions may be identified in a manner which the capture system uses to identify data portions. For example, the data portions may be identified by parsing the document, using techniques disclosed with reference to FIG. 9.

The fingerprints may be a set of hashed data portions (e.g., a first set of hashed data portions) of the data portions identified in the document. One or more fingerprints may be generated for each data portion. For example, a weak fingerprint and a strong fingerprint may be generated for each data portion. A strong fingerprint may be generated using a strong hash function. A weak fingerprint may be generated using a weak hash function. The weak hash function may implement a rolling or a sliding window hashing technique. In some embodiments, a strong fingerprint may be generated based on matching the weak fingerprint to another weak fingerprint of a document. Because strong hash functions may depend on more computing resources, in some embodiments, weak fingerprints may be generated first before a strong fingerprint is generated. A strong fingerprint may be generated for a data portion having a weak fingerprint that matches a weak fingerprint of a document obtained from the capture system. Such a technique may minimize processing performance and minimize consumption of battery of a device by limiting strong fingerprint generation for only those data portions that match based on a weak fingerprint.

The hashed data portions generated may include a weak hashed data portion generated using a weak hash function and a strong hashed data portion generated using a strong hash function. The hashed data portions (e.g., a weak hashed data portion and a strong hashed data portion) may be generated for each data portion identified in a document. A weak hashed data portion and a strong hashed data portion may be generated based on a same data portion in a document.

In some embodiments, a document may be divided into data portions, such as rolling chunks. For example, if the document consists of ABCDEF, then the data portions may consist of ABC, BCD, CDE, and DEF. Embodiments may dynamically change the algorithm or parameters for the algorithm (e.g. size of the chunks) for dividing the document into data portions based on parameters received from the capture system. For example, the most likely to appear content may be divided contextually based on parameters received from the capture system. Fingerprints may be generated for the data portions in a manner similar to the capture system.

At step 806, a request may be sent to a computer system (e.g., a second computer system). The computer system may be the capture computer system 130 of FIG. 1. The request may be for one or more fingerprints (e.g., hashed data portions) corresponding to the document accessed at step

802. The request may include uniquely identifying information of the document to the capture system.

The document may be parsed into data portions. Using techniques described with reference to FIG. 9, a set of hash values, or a "signature," may be generated for the data portions. The set of hash values may be generated based on applying one or more hashing algorithms to the data portions. The set of hash values may be generated as information identifying the document. The request may be sent with the set of hash values. Other information such as the URI may be sent with the request.

In response to the request, the capture system may identify a document that matches the document identified by the document. Using techniques disclosed herein, the document may be identified by comparing the information about the document with information identifying documents known by the capture system. For example, the set of hash values may be compared for the document identified by the request with hash values generated for known documents accessible to the capture system. The known documents may be filtered based on information identifying the document in the request. For example, known documents may be filtered as being associated with a website identified by all or part of a URI. Determining that the document identified by the request matches a known document includes comparing a set of hash values generated for the documents. Documents may match when a threshold number of hash values are matched. The threshold number may be defined a similarity threshold.

A set of fingerprints may be generated for a matching document. The fingerprints may be previously generated or may be generated upon identifying the matching document. In some embodiments, the fingerprints may be generated for data portions in the matching document, where the data portions correspond to content most likely to appear in the document. That is, the fingerprints may be divided into sets keyed to specific uniform resource indicators (URIs), created with the most frequently occurring data portions of documents associated with the URI. Content may be most likely to appear by satisfying a threshold frequency for appearing in the document. In some embodiments, the threshold frequency may be defined for documents related to the document identified in the request, such as documents for a website. In some embodiments, fingerprints for documents and information identifying the documents may be sent to the client in advance of a request. The client may have previously received a predetermined list of fingerprints which may relate to all URIs or a single URI. That is, a single set of fingerprints may be created for the most frequently occurring data portions of documents across all URIs. The client may determine the fingerprints for a document based on a document matching the document accessed at step 802.

At step 808, a response may be received from the second computer system. The response may be responsive to the request at step 806. The response may include one or more fingerprints (e.g., hashed data portions) corresponding to the document identified by the request. In some embodiments, the response may not include fingerprints if a document does not match that identified in the request. In some embodiments, fingerprints for a document may be obtained from local storage and not from capture system. The fingerprints may be received prior to the request. The fingerprints may be identified locally based on matching a document to the document (e.g., a second document) associated with the fingerprints. Similar to step 804, fingerprints can include strong fingerprints, weak fingerprints, or a combination thereof. The fingerprints for the requested document may be generated in a manner similar to that disclosed herein, such as step 804.

In some embodiments, a response may include a set of hashed data portions (e.g., a second set of hashed data portions) identified for a document matching that identified by the request. The set of hashed data portions may include a first hashed data portion generated using a weak hash function and includes a second hashed data portion generated using a strong hash function. The first hashed data portion and the second hashed data portion are generated for a same portion of the data in the first electronic document. In some embodiments, a hashed data portion using a weak hash function and a hashed data portion using a strong hash function may be generated for each of the data portions in the document.

At step 810, the set of hashed data portions ("fingerprints") generated at step 804 are compared to the set of hashed data portions ("fingerprints") received at step 808. The hashed data portions are compared to determine which data portions, if any, of a document are different or have changed. In some embodiments, all of the weak fingerprints and the strong fingerprints may be compared in each of the set of hashed data portions. Different data portions of the document accessed at step 802 may be identified as being new or updated based on fingerprints not matching for those data portions. Fingerprints may be compared based on one or more criteria (e.g., a similarity threshold). Fingerprints may be identified as matching when the criteria are satisfied.

Comparing the hashed data portions may include comparing the weak hashed data portion for each of the plurality of data portions for the first electronic document accessed at step 802 to the weak hashed data portion for each of the plurality of data portions in the second electronic document for which the set of hashed data portions received at step 808. In other words, the weak fingerprints for the document accessed at step 802 may be compared to the weak fingerprints received from the second computer system. In at least one embodiment, the comparing may include identifying, based on comparing the weak hashed data portions for each of the plurality of data portions in the first electronic document, a first set of data portions in the first electronic document. Each of the first set of data portions may be identified for the weak hashed data portion matches a different weak hashed data portion in the second set of hashed data portions for a second set of data portions in the second electronic document.

For weak fingerprints that match, strong fingerprints may be compared for documents. The strong fingerprints may not be generated at step 804, and instead may be generated for those data portions of the document for which weak fingerprints are identified as matching. Such a technique may minimize consumption of processing resources, especially on a mobile device, where resources are limited. The strong fingerprints may be compared to the strong fingerprints for the document received from the second computer system. In at least one embodiment, after identifying the first set of data portions, the comparing may include comparing the strong hashed data portion corresponding to each of the first set of data portions to the strong hashed data portion of a data portion in the second set of data portions having the weak hashed data portion which matched the weak hashed data portion of the data portion in the first set of data portions. The data portions corresponding to the strong hashed data portions may be identified as data portions matching content likely to appear in the documents being compared.

Based on the comparison, at step 812, one or more data portions of the document accessed at step 802 are identified as being changed or different from the second electronic document for which fingerprints are received at step 808. In at least one embodiment, one or more data portions of the first electronic document are different from data portions in the second electronic document. The data portions may be identified as those for which fingerprints do not match, i.e. the data portions identified by the fingerprints obtained from the second computer system differ from the data portions of the document accessed at step 802. Data portions may be identified as being different based on the comparison performed at step 810.

Data portions may be identified as different if their weak fingerprints do not match any of the weak fingerprints obtained from the capture system for a matching document. In one example, based on determining that a hashed data portion of a first data portion in a plurality of data portions in the first electronic document does not match any weak hashed data portion in the second set of hashed data portions, the first data portion is identified for inclusion in the one or more data portions of the first electronic document that are different from the second electronic document. In other words, a data portion may be identified as different upon determining that its weak fingerprint does not match any of the weak fingerprints obtained from the capture system.

As discussed above, after matching weak fingerprints, strong fingerprints may be compared for those data portions having matching weak fingerprints. The data portions may be identified as different if their strong fingerprints do not match any of the strong fingerprints obtained from the capture system. In at least one embodiment, a second data portion of the plurality of data portions in the first electronic document may be identified for inclusion in the one or more data portions of the first electronic document that are different from the second electronic document, where the second data portions is identified based on determining that the strong hashed data portion for the second data portion does not match the strong hashed data portion of the data portion in the second set of data portions. After determining that a strong fingerprint for a data portion does not match a strong fingerprint for that portion based on their weak fingerprints matching, the data portion may be identified as being different.

At step 814, the identified (i.e., changed or different) data portions of the document are sent to the second computer system (e.g., a capture system). The data portions may be identified as changed or different at step 812. By sending only the data portions that have changed, a device implementing workflow 800 may minimize an amount of computing resources to communicate with a capture system. Moreover, the device may be able to limit use of communication bandwidth over a network, by sending only data related to data portions that have changed. The capture system can determine the contents of a document based on the data portions that have changed and the fingerprints of the document for which the content has changed. Workflow 800 can end at step 814.

Upon the capture system receiving the data portions of the document, the capture system may implement a set of instructions to reconstruct the document. In some embodiments, the fingerprints (e.g., the hashed data portions) that matched earlier, may be identified as part of workflow 700. For example, one or more hashed data portions may be identified of a first set of hashed data portions that a match any of the second set of hashed data portions. The fingerprints that are identified as matching may be sent to the second computer system along with the identified hashed data portions that do not match the hashed data portions obtained from the second computer system. In some embodiments, the identified hashed data portions may be sent to the second computer system with information indicating a process to generate the electronic document accessed at step 802. The second computer system can associate the one or more identified data portions as updated to the electronic document for which hashed data portions were received from the second computer system. The second computer system can generate the electronic document (e.g., the first electronic document accessed at step 802) based on the identified data portions. In some embodiments, the second computer system may generate the electronic document also using the information indicating the process and the hashed data portions that matched. For example, the second computer system may construct a document (e.g., a third document) based on the one or more data portions of the second electronic document and the identified data portions. The third electronic document is constructed as an update to the first electronic document having as at least a portion of the first electronic document and the one or more data portions of the second electronic document that are received from the client.

In some embodiments, the second computer system may copy, from the most likely to appear content, the data portions of the document where there were no changes. Then, the capture system may determine the data portions that did not match with the most likely to appear content (i.e., the capture system may move a sliding window, but the data portions received from the client did not match with any of the selected data portions of text most likely to appear). The determined data portions of the document are what were changed from what was originally sent to the client. Accordingly, the capture system can inserts the data portions provided in the unmatched section in the reconstructed document. For example, if the first data portion that did not have any change is data portion 0 and the next data portion that did not have any change is data portion 1, and the unmatched data portion is received after data portion 0, the content of the unmatched data portion is inserted between data portion 0 and data portion 1. In one embodiment, the capture system may store the fully reassembled document. Other embodiments may store the client response in the compressed delta encoding format for reduced storage.

II. Document Signature Generation

Figure 9:
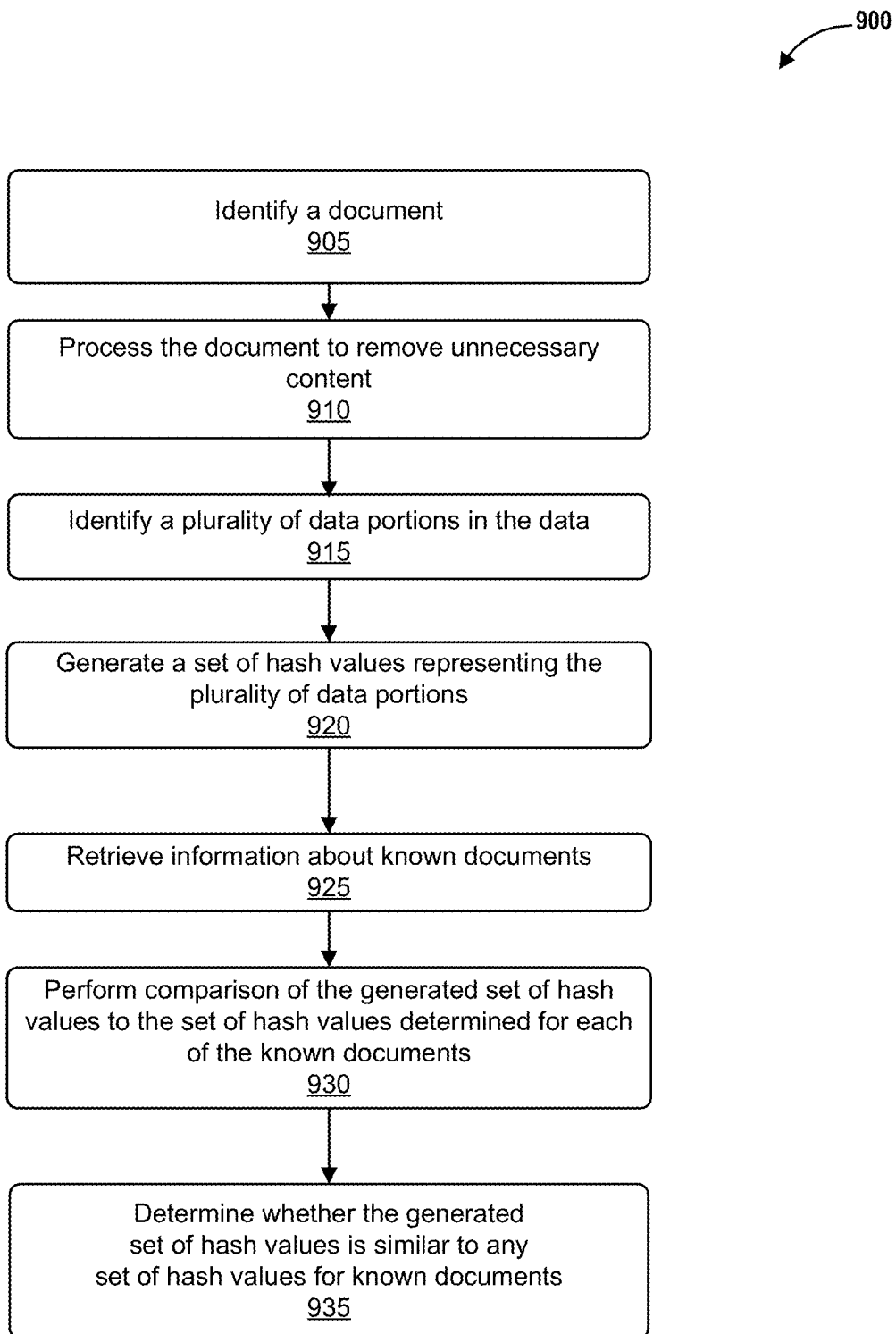

Now turning to FIG. 9 is an example of a workflow 900 of a process for determining information identifying a document according to some embodiments. The information, or "signature," may be used to uniquely identify a document. The signature may be associated with the document. Documents may be compared by their signatures, each individually generated, to determine whether any two documents match. A client and a capture system may use signatures to identify documents to be compared as disclosed herein.

In at least one embodiment, a capture system may implement all or part of workflow 900. For example, as part one a process disclosed herein, the capture system may receive information identifying a document accessed by a client. The capture system may perform workflow 900 to determine whether any known document matches the accessed document. Based on determining that a known document matches the accessed document, the capture system can provide the client with fingerprints for the matching document as described in other embodiments. The set of hash values for known documents may be generated in advance of receiving a request from a client. The known documents may be identified based on a part of the information identifying the accessed document, such as a URL of the accessed document.

Workflow 900 may begin at step 905, a document may be identified for processing to determine its signature. A document may be identified by its signature. The signature of a document may be defined by information about the document. The document may include content, which may define the document. The data for a document may include metadata, or other information in addition to the content. A document accessed at a client may have text. Most of the content of the document may be similar between computer systems requesting the content (e.g., requesting a web page for the same URL). However, some communications from web servers may serve dynamic data and responses that differ by varying amounts. In order to efficiently identify changes of the content between communications, some embodiments may perform a comparison of the content in a communication to known documents using techniques disclosed herein. As discussed above, a known document may store content from previous communications. The comparison may occur using a set of data portions (e.g., tokens) that are identifiable in the content of a document. A data portion may include one or more characters, such as a string of characters. The characters may be identified as a token. A set of tokens in a communication may divide the content in a document. Specifically, content that is tokenized may be easily compared and stored.

At step 910, a document may be processed to remove unnecessary content. Unnecessary content may include content that does not define a resource in the communication. For example, unnecessary content may include metadata or formatting data of a resource in the communication. The unnecessary content may be identified and extracted using techniques known by a person skilled in the art. For example, content to be removed may be identified and extracted by parsing data such as information for displaying the document or accessing the document. Unnecessary content such as metadata may be identified based on a known format. Removing unnecessary content may assist in the identification of content in the document.

At step 915, a plurality of data portions are identified in a document. Each of the plurality of data portions may form a portion of content in the document. In some instances, one or more of the data portions may include formatting of the content. In some embodiments, a plurality of data portions may be a plurality of tokens identified by parsing content in the document. A plurality of data portions may be identified by implementing techniques disclosed herein. For example, a plurality of data portions may be identified by parsing the content using one or more delimiters by implementing techniques disclosed herein.

In at least one embodiment, content in a document may be parsed to identify a plurality of data portions (e.g., a plurality of tokens), each data portion corresponding to a token of data. For example, when content is a text document, the plurality of data portions may be identified by parsing the content using one or more delimiters. Where content is an HTML document, delimiters such as a space (' '), '<', and '>' may be used to parse the content to identify the plurality of data portions. Delimiters may be chosen to optimize computing performance. The choice of delimiters may impact processing performance during processing for comparison of content to templates. The choice of delimiters may be based on the type of content and/or format of content (e.g., HTML or Javascript).

In at least one embodiment, content in a document may be parsed into tokens. The tokens may be the data portions identified for a document. In some embodiments, content in a document may be parsed using one or more delimiters. A document may include content that includes tags for formatting. A delimiter may be defined as a pre-determined token, such as the examples discussed below. The tokens used for parsing may be selected based on a format of the content. The parsed content may be useful for comparing content to a known document. Care should be considered for determining the tokens to use for parsing content to ensure an optimal trade off of size and effectiveness of dividing the document. The use of too many tokens can lead to more work in processing and less meaning with regard to identifying like changes across multiple documents. By using too few tokens, the difference algorithm results in modifications that are clustered in too large of a change to make the processing and comparison efficient.

In one embodiment where a document is a web text document, the tokens may include '<', '>', ';', '{', '}', '[', ']', ',', '\n'. A combination of tokens may be based on the above conditions, enabling a balance of the effects of the algorithm in capturing discreet changes in a resource having JavaScript, CSS, HTML, and web content. In some embodiments, parsing a document using tokens such as a space (' '), '<', or '>' may maximize CPU performance for parsing. Often, differences between requests to the same web page from multiple clients are due to content changes. For example, one user may have "Welcome back, Joe", while another user may have "Welcome back, Sally". To record the differences in a compact format, it is beneficial to compare the template to the content portions of a web document received in a communication. By selecting the appropriate tokens, the content can be separated from the formatting tags. A document is shown as an example of the web response document of divided using the preferred tokens discussed above. By dividing content using the preferred tokens, the elements of the content can be easily compared to a template to enable an optimally short edit script to be created. By tokenizing the document in this format, the content is separated from the formatting tags.

At step 920, a set of hash values may be generated to represent the plurality of data portions. The set of hash values may be associated with the document as its signature, or information identifying the document. The set of hash values may be generated using a hashing algorithm. In some embodiments, the hashing algorithm is a minimum hashing ("MinHash") algorithm, which can be used to determine the similarity of two data sets. Techniques for comparing data sets are disclosed herein for determining the similarity of the plurality of data portions between two documents. As part of determining the similarity of two data sets, a set of hash values may be generated for the plurality of data portions to be compared later to a document requested by a client.

In at least one embodiment, a min hash algorithm may be implemented to generate the set of hash values for the plurality of data portions. The set of hash values may correspond to the set of minimum hash values generated for the plurality of data portions for implementing the min hash algorithm. Initially, a shingle length value may be determined, where the shingle length value is a value that defines a group of data portions of the plurality of portions, the group being the number of consecutive data portions of the plurality of data portions that will be processed using the algorithm. Determination of shingle length value may be based on processing performance considerations, such as the size of content defined by the number of data portions. One or more hashing algorithms may be performed against each of the data portions in a group of data portions defined by the shingle length value. The number of hashing algorithms applied to a group of data portions may be based on processing performance considerations, such as processing performance for comparison of content with a template. The hashing algorithms may be applied to each of the data portions in all of the groups of data portions identified based on the shingle length value.

Upon determining a shingle length, one or more groups of data portions are identified in the plurality of data portions based on the shingle length. Each group of data portions is identified based on the shingle length value as one or more different consecutive data portions in the plurality of data portions. For example, a group of data portions may be five consecutive data portions when the shingle length value is five. For each group of data portions, one or more hashing algorithms are performed for each data portions in the group of data portions defined by a shingle length value. In at least one embodiment, for the number of hashing algorithms applied to each group of data portions, each of the hashing algorithms may be applied to each data portion in the group. The result of the application of the hashing algorithms to a data portion are used as a seed to the next data portion. The result of applying the hashing algorithms to the next data portion is used as a seed for the next data portion and so on in the group of data portions until the group of data portions are processed for the hashing algorithms. As an example, the shingle length is five and the number of hashing algorithms is 100. For a group of five data portions (e.g., five tokens), a 100 hashing algorithms will be applied to each token, taking the resulting value of each and applying it to the next token in the group. So in other words, hashing algorithms will be applied across the five tokens in the group.

In some embodiments, for each one of the different hashing algorithms applied to each data portion in the group of data portions, an algorithm (e.g., a themed algorithm) may then be applied such that a minimum hash value of each of the data portions, based on application of the hashing algorithms to the group, will be generated across all of the data portions in the group. The themed algorithm may be applied to each of the next groups of data portions. A set of hash values may be determined for each of the plurality of data portions. The set of hash values may be the minimum hash values generated for each of the data portions of the groups of data portions.

In some embodiments, the generated set of hash values may be transmitted from one computer (e.g., client device 102) to another computer (e.g., computer system 130). The set of hash values may be generated at a client based on data obtained by the client. As such, to minimize sending all of the data of a communication to computer system 130, the client may send the generated set of hash values, which can be used for comparison with hash values, or signatures, of known documents identified by computer system 130 as further detailed below. By sending the set of hash values instead of the content in a communication, the amount of bandwidth consumed is minimized for retransmission of content for template generation. In other words, the client can minimize use of network bandwidth by sending the generated hash values instead of the actual content, which may consume more bandwidth.

At step 925, information identifying known documents, if any are stored, may be retrieved. The information may include a set of hash values generated for each of the documents. The documents may be known for a website. The documents may be identified on the basis of information identifying the document identified at step 905. A data store with the information identifying known documents may be accessed to obtain the data identifying those documents. In some embodiments, documents may be identified based on information for the identified document at step 905. For example, known may be identified based on a URL or an element of a URL of the identified document. In some embodiments, a set of hash values may be determined for each of the known documents. A set of hash values for a known document may be generated using a hashing algorithm as applied at step 920. In some embodiments, the set of hash values generated for a known down may be stored in association with the known document. The set of hash values for the known document may be generated at the first instance the document is identified. As will be explained below, the set of hash values for each known document can be compared to the set of hash values generated for the document identified at step 905.

At step 930, a comparison is performed between the set of hash values generated at step 920 and the set of hash values for each of the known document. Any number of comparison techniques may be applied as known by a person skilled in the art. A result may be generated based on the comparison. A result value may be generated that indicates a measure of the difference or the similarity between the content in the communication and the template. A result may indicate the value(s) that are different between the sets of hash values that are compared.

At step 935, a determination is made whether the generated set of hash values is similar to any of the set of hash values determined for the known documents. A determination that the sets of hash values may be similar may be based on whether the sets of hash values match exactly. A similarity metric analysis may be performed to determine a similarity metric. The similarity metric may be computed using one or more of a Jaccard Index or other method of similarity analysis known to a person skilled in the art. One or more comparison criteria may be defined for comparison of the sets of hash values. The criteria may be selected to achieve a desired balance of compression with respect to storage. The similarity analysis can be assessed based on the criteria to determine whether the sets of hash values are similar. For example, the comparison criteria may include a similarity threshold (e.g., a value defining a percentage of similarity). The result (e.g., similarity metric) of the similarity analysis may be assessed in view of the similarity threshold, such that the sets of hash values may be deemed similar when the similarity threshold is satisfied.

More criteria or criteria (e.g., a higher similarity threshold) that are harder to satisfy may achieve better compression, but may result in additional storage as new known documents are likely to be created. Less strict criteria (e.g., a lower similarity threshold) may result in use of less storage but less effective compression per communication.

Workflow 900 can end at step 935.

III. General Computer System for Capture Management System and Client Systems

Figure 10:
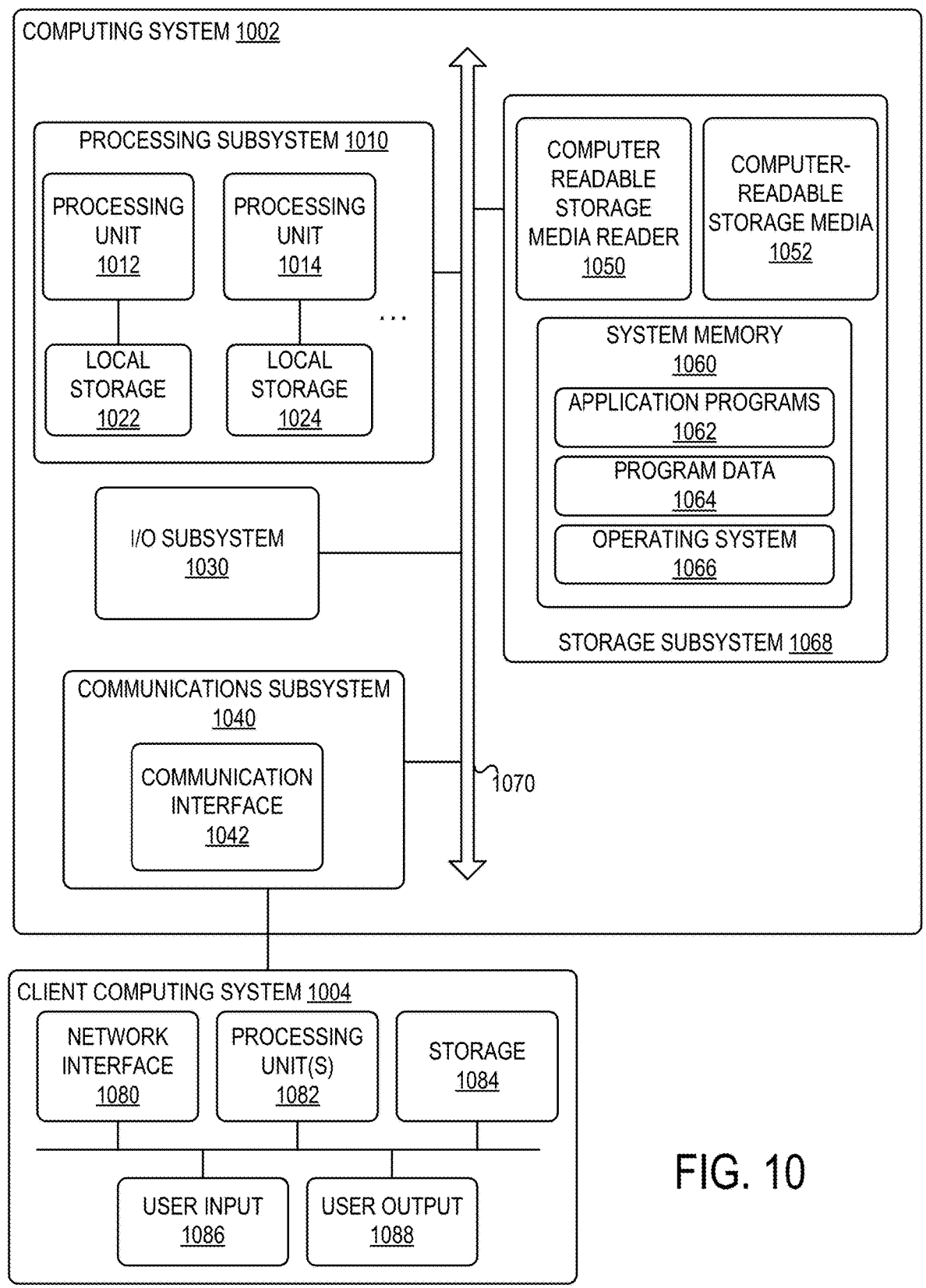
FIG. 10 shows a simplified block diagram of a representative computing system and client computing system usable to implement certain embodiments.

Various operations described herein may be implemented on computer systems, which may be of generally conventional design. FIG. 10 shows a simplified block diagram of a representative computing system 1002 and client computing system 1004 usable to implement certain embodiments of the present disclosure. In various embodiments, computing system 1002 or similar systems may implement capture management system, or any other computing system described herein or portions thereof. Client computing system 1004 or similar systems may implement client system 122, or other client systems described herein.

Computing system 1002 may be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system.

Computing system 1002 may include processing subsystem 1010. Processing subsystem 1010 may communicate with a number of peripheral systems via bus subsystem 1070. These peripheral systems may include I/O subsystem 1030, storage subsystem 1068, and communications subsystem 1040.

Bus subsystem 1070 provides a mechanism for letting the various components and subsystems of server computing system 1004 communicate with each other as intended. Although bus subsystem 1070 is shown schematically as a single bus, alternative embodiments of the bus subsystem may utilize multiple buses. Bus subsystem 1070 may form a local area network that supports communication in processing subsystem 1010 and other components of server computing system 1020. Bus subsystem 1070 may be implemented using various technologies including server racks, hubs, routers, etc. Bus subsystem 1070 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which may be implemented as a Mezzanine bus manufactured to the IEEE P1386.1 standard, and the like.

I/O subsystem 1030 may include devices and mechanisms for inputting information to computing system 1002 and/or for outputting information from or via computing system 1002. In general, use of the term "input device" is intended to include all possible types of devices and mechanisms for inputting information to computing system 1002. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computing system 1002 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Processing subsystem 1010 controls the operation of computing system 1002 and may comprise one or more processing units 1012, 1014, etc. A processing unit may include one or more processors, including single core processor or multicore processors, one or more cores of processors, or combinations thereof. In some embodiments, processing subsystem 1010 may include one or more special purpose co-processors such as graphics processors, digital signal processors (DSPs), or the like. In some embodiments, some or all of the processing units of processing subsystem 1010 may be implemented using customized circuits, such as application specific integrated circuits (ASICs), or field programmable gate arrays (FPGAs). In some embodiments, such integrated circuits execute instructions that are stored on the circuit itself. In other embodiments, processing unit(s) may execute instructions stored in local storage, e.g., local storage 1022, 1024. Any type of processors in any combination may be included in processing unit(s) 1012, 1014.

In some embodiments, processing subsystem 1010 may be implemented in a modular design that incorporates any number of modules (e.g., blades in a blade server implementation). Each module may include processing unit(s) and local storage. For example, processing subsystem 1010 may include processing unit 1012 and corresponding local storage 1022, and processing unit 1014 and corresponding local storage 1024.

Local storage 1022, 1024 may include volatile storage media (e.g., conventional DRAM, SRAM, SDRAM, or the like) and/or non-volatile storage media (e.g., magnetic or optical disk, flash memory, or the like). Storage media incorporated in local storage 1022, 1024 may be fixed, removable or upgradeable as desired. Local storage 1022, 1024 may be physically or logically divided into various subunits such as a system memory, a ROM, and a permanent storage device. The system memory may be a read-and-write memory device or a volatile read-and-write memory, such as dynamic random access memory. The system memory may store some or all of the instructions and data that processing unit(s) 1012, 1014 need at runtime. The ROM may store static data and instructions that are needed by processing unit(s) 1012, 1014. The permanent storage device may be a non-volatile read-and-write memory device that may store instructions and data even when a module including one or more processing units 1012, 1014 and local storage 1022, 1024 is powered down. The term "storage medium" as used herein includes any medium in which data may be stored indefinitely (subject to overwriting, electrical disturbance, power loss, or the like) and does not include carrier waves and transitory electronic signals propagating wirelessly or over wired connections.

In some embodiments, local storage 1022, 1024 may store one or more software programs to be executed by processing unit(s) 1012, 1014, such as an operating system and/or programs implementing various server functions such as functions of capture management system, or any other server(s) associated with capture management system. "Software" refers generally to sequences of instructions that, when executed by processing unit(s) 1012, 1014 cause computing system 1002 (or portions thereof) to perform various operations, thus defining one or more specific machine implementations that execute and perform the operations of the software programs. The instructions may be stored as firmware residing in read-only memory and/or program code stored in non-volatile storage media that may be read into volatile working memory for execution by processing unit(s) 1012, 1014. In some embodiments the instructions may be stored by storage subsystem 1068 (e.g., computer readable storage media). In various embodiments, the processing units may execute a variety of programs or code instructions and may maintain multiple concurrently executing programs or processes. At any given time, some or all of the program code to be executed may be resident in local storage 1022, 1024 and/or in storage subsystem including potentially on one or more storage devices. Software may be implemented as a single program or a collection of separate programs or program modules that interact as desired. From local storage 1022, 1024 (or non-local storage described below), processing unit(s) 1012, 1014 may retrieve program instructions to execute and data to process in order to execute various operations described above.

Storage subsystem 1068 provides a repository or data store for storing information that is used by computing system 1002. Storage subsystem 1068 provides a tangible non-transitory computer-readable storage medium for storing the basic programming and data constructs that provide the functionality of some embodiments. Software (programs, code modules, instructions) that when executed by processing subsystem 1010 provide the functionality described above may be stored in storage subsystem 1068. The software may be executed by one or more processing units of processing subsystem 1010. Storage subsystem 1068 may also provide a repository for storing data used in accordance with the present disclosure.

Storage subsystem 1068 may include one or more non-transitory memory devices, including volatile and non-volatile memory devices. As shown in FIG. 10, storage subsystem 1068 includes a system memory 1060 and a computer-readable storage media 1052. System memory 1060 may include a number of memories including a volatile main RAM for storage of instructions and data during program execution and a non-volatile ROM or flash memory in which fixed instructions are stored. In some implementations, a basic input/output system (BIOS), containing the basic routines that help to transfer information between elements within computing system 1002, such as during start-up, may typically be stored in the ROM. The RAM typically contains data and/or program modules that are presently being operated and executed by processing subsystem 1010. In some implementations, system memory 1060 may include multiple different types of memory, such as static random access memory (SRAM) or dynamic random access memory (DRAM). Storage subsystem 1068 may be based on magnetic, optical, semiconductor, or other data storage media. Direct attached storage, storage area networks, network-attached storage, and the like may be used. Any data stores or other collections of data described herein as being produced, consumed, or maintained by a service or server may be stored in storage subsystem 1068.

By way of example, and not limitation, as depicted in FIG. 10, system memory 1060 may store application programs 1062, which may include client applications, Web browsers, mid-tier applications, relational database management systems (RDBMS), etc., program data 1064, and one or more operating systems 1066. By way of example, an example operating systems may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Computer-readable storage media 1052 may store programming and data constructs that provide the functionality of some embodiments. Software (programs, code modules, instructions) that when executed by processing subsystem 1010 a processor provide the functionality described above may be stored in storage subsystem 1068. By way of example, computer-readable storage media 1052 may include non-volatile memory such as a hard disk drive, a magnetic disk drive, an optical disk drive such as a CD ROM, DVD, a Blu-Ray® disk, or other optical media. Computer-readable storage media 1052 may include, but is not limited to, Zip® drives, flash memory cards, universal serial bus (USB) flash drives, secure digital (SD) cards, DVD disks, digital video tape, and the like. Computer-readable storage media 1052 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. Computer-readable media 1052 may provide storage of computer-readable instructions, data structures, program modules, and other data for computing system 1002.

In certain embodiments, storage subsystem 1068 may also include a computer-readable storage media reader 1050 that may further be connected to computer-readable storage media 1052. Together and, optionally, in combination with system memory 1060, computer-readable storage media 1052 may comprehensively represent remote, local, fixed, and/or removable storage devices plus storage media for storing computer-readable information.

In certain embodiments, computing system 1002 may provide support for executing one or more virtual machines. Computing system 1002 may execute a program such as a hypervisor for facilitating the configuring and managing of the virtual machines. Each virtual machine may be allocated memory, compute (e.g., processors, cores), I/O, and networking resources. Each virtual machine typically runs its own operating system, which may be the same as or different from the operating systems executed by other virtual machines executed by computing system 1002. Accordingly, multiple operating systems may potentially be run concurrently by computing system 1002. Each virtual machine generally runs independently of the other virtual machines.

Communication subsystem 1040 provides an interface to other computer systems and networks. Communication subsystem 1040 serves as an interface for receiving data from and transmitting data to other systems from computing system 1002. For example, communication subsystem 1040 may enable computing system 1002 to establish a communication channel to one or more client computing devices via the Internet for receiving and sending information from and to the client computing devices.

Communication subsystem 1040 may support both wired and/or wireless communication protocols. For example, in certain embodiments, communication subsystem 1040 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communication subsystem 1040 may provide wired network connectivity (e.g., Ethernet) in addition to or instead of a wireless interface.

Communication subsystem 1040 may receive and transmit data in various forms. For example, in some embodiments, communication subsystem 1040 may receive input communication in the form of structured and/or unstructured data feeds, event streams, event updates, and the like. For example, communication subsystem 1040 may be configured to receive (or send) data feeds in real-time from users of social media networks and/or other communication services such as Twitter® feeds, Facebook® updates, web feeds such as Rich Site Summary (RSS) feeds, and/or real-time updates from one or more third party information sources.

In certain embodiments, communication subsystem 1040 may be configured to receive data in the form of continuous data streams, which may include event streams of real-time events and/or event updates, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communication subsystem 1040 may also be configured to output the structured and/or unstructured data feeds, event streams, event updates, and the like to one or more databases that may be in communication with one or more streaming data source computers coupled to computing system 1002.

Communication subsystem 1040 may provide a communication interface 1042, e.g., a WAN interface, which may provide data communication capability between the local area network (bus subsystem 1070) and a larger network, such as the Internet. Conventional or other communications technologies may be used, including wired (e.g., Ethernet, IEEE 802.3 standards) and/or wireless technologies (e.g., Wi-Fi, IEEE 802.11 standards).

Computing system 1002 may operate in response to requests received via communication interface 1042. Further, in some embodiments, communication interface 1042 may connect computing systems 1002 to each other, providing scalable systems capable of managing high volumes of activity. Conventional or other techniques for managing server systems and server farms (collections of server systems that cooperate) may be used, including dynamic resource allocation and reallocation.

Computing system 1002 may interact with various user-owned or user-operated devices via a wide-area network such as the Internet. An example of a user-operated device is shown in FIG. 10 as client computing system 1002. Client computing system 1004 may be implemented, for example, as a consumer device such as a smart phone, other mobile phone, tablet computer, wearable computing device (e.g., smart watch, eyeglasses), desktop computer, laptop computer, and so on.

For example, client computing system 1004 may communicate with computing system 1002 via communication interface 1042. Client computing system 1004 may include conventional computer components such as processing unit(s) 1082, storage device 1084, network interface 1080, user input device 1086, and user output device 1088. Client computing system 1004 may be a computing device implemented in a variety of form factors, such as a desktop computer, laptop computer, tablet computer, smart phone, other mobile computing device, wearable computing device, or the like.

Processing unit(s) 1082 and storage device 1084 may be similar to processing unit(s) 1012, 1014 and local storage 1022, 1024 described above. Suitable devices may be selected based on the demands to be placed on client computing system 1004; for example, client computing system 1004 may be implemented as a "thin" client with limited processing capability or as a high-powered computing device. Client computing system 1004 may be provisioned with program code executable by processing unit(s) 1082 to enable various interactions with computing system 1002 of a message management service such as accessing messages, performing actions on messages, and other interactions described above. Some client computing systems 1004 may also interact with a messaging service independently of the message management service.

Network interface 1080 may provide a connection to a wide area network (e.g., the Internet) to which communication interface 1040 of computing system 1002 is also connected. In various embodiments, network interface 1080 may include a wired interface (e.g., Ethernet) and/or a wireless interface implementing various RF data communication standards such as Wi-Fi, Bluetooth, or cellular data network standards (e.g., 3G, 4G, LTE, etc.).

User input device 1086 may include any device (or devices) via which a user may provide signals to client computing system 1004; client computing system 1004 may interpret the signals as indicative of particular user requests or information. In various embodiments, user input device 1086 may include any or all of a keyboard, touch pad, touch screen, mouse or other pointing device, scroll wheel, click wheel, dial, button, switch, keypad, microphone, and so on.

User output device 1088 may include any device via which client computing system 1004 may provide information to a user. For example, user output device 1088 may include a display to display images generated by or delivered to client computing system 1004. The display may incorporate various image generation technologies, e.g., a liquid crystal display (LCD), light-emitting diode (LED) including organic light-emitting diodes (OLED), projection system, cathode ray tube (CRT), or the like, together with supporting electronics (e.g., digital-to-analog or analog-to-digital converters, signal processors, or the like). Some embodiments may include a device such as a touchscreen that function as both input and output device. In some embodiments, other user output devices 1088 may be provided in addition to or instead of a display. Examples include indicator lights, speakers, tactile "display" devices, printers, and so on.

Some embodiments include electronic components, such as microprocessors, storage and memory that store computer program instructions in a computer readable storage medium. Many of the features described in this specification may be implemented as processes that are specified as a set of program instructions encoded on a computer readable storage medium. When these program instructions are executed by one or more processing units, they cause the processing unit(s) to perform various operation indicated in the program instructions. Examples of program instructions or computer code include machine code, such as is produced by a compiler, and files including higher-level code that are executed by a computer, an electronic component, or a microprocessor using an interpreter. Through suitable programming, processing unit(s) 1012, 1014 and 1082 may provide various functionality for computing system 1002 and client computing system 1004, including any of the functionality described herein as being performed by a server or client, or other functionality associated with message management services.

It will be appreciated that computing system 1002 and client computing system 1004 are illustrative and that variations and modifications are possible. Computer systems used in connection with embodiments of the present disclosure may have other capabilities not specifically described here. Further, while computing system 1002 and client computing system 1004 are described with reference to particular blocks, it is to be understood that these blocks are defined for convenience of description and are not intended to imply a particular physical arrangement of component parts. For instance, different blocks may be but need not be located in the same facility, in the same server rack, or on the same motherboard. Further, the blocks need not correspond to physically distinct components. Blocks may be configured to perform various operations, e.g., by programming a processor or providing appropriate control circuitry, and various blocks might or might not be reconfigurable depending on how the initial configuration is obtained. Embodiments of the present disclosure may be realized in a variety of apparatus including electronic devices implemented using any combination of circuitry and software.

While this disclosure has been described with respect to specific embodiments, one skilled in the art will recognize that numerous modifications are possible. For instance, although specific processes are described with reference to FIGS. 1 and 2, other processes may be implemented. Embodiments of this disclosure may be realized using a variety of computer systems and communication technologies including but not limited to specific examples described herein.

Embodiments of the present disclosure may be realized using any combination of dedicated components and/or programmable processors and/or other programmable devices. The various processes described herein may be implemented on the same processor or different processors in any combination. Where components are described as being configured to perform certain operations, such configuration may be accomplished, e.g., by designing electronic circuits to perform the operation, by programming programmable electronic circuits (such as microprocessors) to perform the operation, or any combination thereof. Further, while the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features of the present disclosure may be encoded and stored on various computer readable storage media; suitable media include magnetic disk or tape, optical storage media such as compact disk (CD) or DVD (digital versatile disk), flash memory, and other non-transitory media. Computer readable media encoded with the program code may be packaged with a compatible electronic device, or the program code may be provided separately from electronic devices (e.g., via Internet download or as a separately packaged computer-readable storage medium).

It is apparent for those skilled in the art that, for the particular operation processes of the units described above, reference may be made to the corresponding steps/components in the related method/system embodiment sharing the same concept and the reference is regarded as the disclosure of the related units too. And therefore some of the particular operation processed will not be described repeatedly or in detail for concision of the description.

It should be understood that any of the embodiments of the present disclosure can be implemented in the form of control logic using hardware (e.g. an application specific integrated circuit or field programmable gate array) and/or using computer software with a generally programmable processor in a modular or integrated manner. As used herein, a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present disclosure using hardware and a combination of hardware and software.

Any of the software components or functions described in this application may be implemented as software code to be executed by a processor using any suitable computer language such as, for example, Java, C, C++, C #, Objective-C, Swift, or scripting language such as Perl or Python using, for example, conventional, functional, and/or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present disclosure may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer apparatus may include a monitor, printer, or other suitable display for providing any of the results mentioned herein to a user.

Any of the methods disclosed herein may be totally or partially performed with a computer system including one or more processors, which can be configured to perform the steps. Thus, embodiments can be directed to computer systems configured to perform the steps of any of the methods disclosed herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, any of the steps of any of the methods can be performed with modules, circuits, or other means for performing these steps.

The features and advantages described in the detailed description are not all inclusive and, in particular, many additional features and advantages will be apparent to one of ordinary skill in the art in view of the drawings, detailed description, and claims. Moreover, it should be noted that the language used in the detailed description has been principally selected for readability and instructional purposes, and may not have been selected to delineate or circumscribe the inventive subject matter.

Note that in this description, references to "one embodiment," "an embodiment" or "some embodiments" mean that the feature being referred to is included in at least one embodiment of this disclosure. Further, separate references to "one embodiment" or "some embodiments" in this description do not necessarily refer to the same embodiment(s); however, neither are such embodiments mutually exclusive, unless so stated and except as will be readily apparent to those skilled in the art. Thus, this disclosure can include any variety of combinations and/or integrations of the embodiments disclosed herein. However, other embodiments of this disclosure may be directed to specific embodiments relating to each individual aspect, or specific combinations of these individual aspects. Thus, although this disclosure has been described with respect to specific embodiments, it will be appreciated that this disclosure is intended to cover all modifications and equivalents within the scope of the following claims.

Upon reading this detailed description, those of skill in the art will appreciate still additional alternative structural and functional designs for a system and method for compact data storage of network traffic and efficient search through the disclosed principles of the present disclosure. Thus, while particular embodiments and applications of the present disclosure have been illustrated and described, it is to be understood that this disclosure is not limited to the precise construction and components disclosed herein and that various modifications, changes and variations which will be apparent to those skilled in the art may be made in the arrangement, operation and details of the method and apparatus of the present disclosure herein without departing from the spirit and scope of this disclosure as defined in the appended claims.

A recitation of "a", "an" or "the" is intended to mean "one or more" unless specifically indicated to the contrary. The use of "or" is intended to mean an "inclusive or," and not an "exclusive or" unless specifically indicated to the contrary.

All patents, patent applications, publications, and descriptions mentioned herein are incorporated by reference in their entirety for all purposes. None is admitted to be prior art.

What is claimed is:

1. A computer-implemented method comprising:
   registering, by a capture system, for notifications with a native environment of a client device, the native environment including an operating system, wherein the notifications relate to changes in views displayed on the client device, wherein the notifications related to the changes in views displayed on the client device are independent of any native application executing on the native environment on the client device for which views are to be monitored, wherein the capture system is implemented at the client device;
   receiving, by the capture system, a first notification indication that a native application executing on the client device is loading a view in the native environment;
   analyzing, by the capture system, the view in the native application to determine a layout of the view;
   generating, by the capture system, a document including the layout of the view in the native application;
   storing, by the capture system, the document including the layout of the view in the native application;
   detecting, by the capture system, a change in the layout of the view in the native application, based on a second notification that is received relating to monitoring the native application on the client device based on the registration for the notifications with the native environment of the client device; and
   performing, by the capture system, an operation based on the change in the layout of the view, wherein performing the operation includes sending, to a server computer, a notification about the change in the layout of the view.

2. The computer-implemented method of claim 1, further comprising:
   invoking the capture system to determine the layout of the view.

3. The computer-implemented method of claim 1, further comprising:
   updating the layout of the view in the document based on the detected change; and
   storing, by the capture system, the update to the layout in the document.

4. The computer-implemented method of claim 1, wherein the client device is a mobile device.

5. The computer-implemented method of claim 1, wherein performing the operation includes generating a graphical interface to display the view based on the layout in the document, wherein the view is displayed showing the detected change.

6. The computer-implemented method of claim 1, wherein a communication between the server computer and the client device is specific to the native application for the native environment.

7. The computer-implemented method of claim 1, further comprising:
   identifying, by the capture system, differences between views generated by a plurality of applications configured for different native environments; and
   generating, by the capture system, the layout of the view that includes an indication of the differences between the views of the plurality of applications for the different native environments.

8. The computer-implemented method of claim 1, wherein the change in the layout of the view in the native application is detected based on one or more changes in one or more data portions associated with the document, wherein the layout of the view in the native application is determined using a Document object Model (DOM) associated with the view.

9. The computer-implemented method of claim 1, wherein a format of the document is different from a format of the native application.

10. A capture system comprising:
one or more processors; and
a memory accessible to the one or more processors, the memory comprising instructions that, when executed by the one or more processors, cause the one or more processors to:
register for notifications with a native environment of a client device, wherein the notifications relate to changes in views displayed on the client device, wherein the notifications related to the changes in views displayed on the client device are independent of any native application executing on the native environment on the client device for which views are to be monitored, wherein the one or more processors and the memory are included in the client device;
receive a first notification indication that a native application on the client device is loading a view in the native application;
analyze the view in the native application to determine a layout of the view;
generate a document including the layout of the view in the native application;
store the document including the layout of the view in the native application;
detect a change in the layout of the view in the native application, based on a second notification that is received relating to monitoring operation of the native application on the client device based on the registration for the notifications with the native environment of the client device; and
perform an operation based on the change in the layout of the view, wherein performing the operation includes sending, to a server computer, a notification about the change in the layout of the view.

11. The capture system of claim 10, wherein the instructions that, when executed by the one or more processors, further cause the one or more processors to:
invoke the capture system to determine the layout of the view.

12. The capture system of claim 10, wherein the instructions that, when executed by the one or more processors, further cause the one or more processors to:
update the layout of the view in the document based on the detected change; and
store, by the capture system, the update to the layout in the document.

13. The capture system of claim 10, wherein the client device is a mobile device.

14. The capture system of claim 10, wherein performing the operation includes generating a graphical interface to display the view based on the layout in the document, wherein the view is displayed showing the detected change.

15. A computer product comprising a non-transitory computer readable medium storing a plurality of instructions, the plurality of instructions comprising:
registering, by a capture system, for notifications with a native environment of a client device, the native environment including an operating system, wherein the notifications relate to changes in views displayed on the client device, wherein the notifications related to the changes in views displayed on the client device are independent of any native application executing on the native environment on the client device for which views are to be monitored, wherein the capture system is implemented at the client device;
receiving, by the capture system, a first notification indication that a native application executing on the client device is loading a view in the native environment;
analyzing, by the capture system, the view in the native application to determine a layout of the view;
generating, by the capture system, a document including the layout of the view in the native application;
storing, by the capture system, the document including the layout of the view in the native application;
detecting, by the capture system, a change in the layout of the view in the native application, based on a second notification that is received relating to monitoring the native application on the client device based on the registration for the notifications with the native environment of the client device; and
performing, by the capture system, an operation based on the change in the layout of the view, wherein performing the operation includes sending, to a server computer, a notification about the change in the layout of the view.

* * * * *